US010345941B2

(12) United States Patent
Nakai et al.

(10) Patent No.: US 10,345,941 B2
(45) Date of Patent: Jul. 9, 2019

(54) TRANSPARENT BASE MATERIAL FILM LAMINATE, TOUCH PANEL SENSOR FILM, TOUCH PANEL, IMAGE DISPLAY DEVICE, AND METHOD FOR IMPROVING VISIBILITY OF IMAGE DISPLAY DEVICE

(71) Applicant: FUJIFILM Corporation, Tokyo (JP)

(72) Inventors: Shinichi Nakai, Fujinomiya (JP); Yuki Matsunami, Fujinomiya (JP); Reona Ikeda, Fujinomiya (JP); Tadashi Kuriki, Fujinomiya (JP)

(73) Assignee: FUJIFILM Corporation, Tokyo (JP)

( * ) Notice: Subject to any disclaimer, the term of this patent is extended or adjusted under 35 U.S.C. 154(b) by 91 days.

(21) Appl. No.: 15/782,296

(22) Filed: Oct. 12, 2017

(65) Prior Publication Data

US 2018/0046299 A1 Feb. 15, 2018

Related U.S. Application Data

(63) Continuation of application No. PCT/JP2016/061709, filed on Apr. 11, 2016.

(30) Foreign Application Priority Data

Apr. 13, 2015 (JP) ................................. 2015-082030

(51) Int. Cl.
*G06F 3/045* (2006.01)
*G06F 3/041* (2006.01)
(Continued)

(52) U.S. Cl.
CPC .............. *G06F 3/0412* (2013.01); *B32B 7/02* (2013.01); *B32B 9/00* (2013.01); *B32B 27/36* (2013.01);
(Continued)

(58) Field of Classification Search
USPC ............. 345/173, 174, 8, 87, 592; 428/1.31; 359/489.03, 487.02, 485.01; 349/117, 85,
(Continued)

(56) References Cited

U.S. PATENT DOCUMENTS

2005/0237307 A1* 10/2005 Hieda ................... G06F 3/0488
345/173
2006/0093759 A1* 5/2006 Fukagawa .................. C08J 5/18
428/1.31
(Continued)

FOREIGN PATENT DOCUMENTS

JP      2011-107198 A    6/2011
JP      2012-230491 A   11/2012
(Continued)

OTHER PUBLICATIONS

International Search Report for PCT/JP2016/061709 dated Jul. 12, 2016 [PCT/ISA/210].
(Continued)

*Primary Examiner* — Thuy N Pardo
(74) *Attorney, Agent, or Firm* — Sughrue Mion, PLLC

(57) ABSTRACT

Provided are a transparent base material film laminate that is used by being arranged on the viewing side of a polarizing plate of an image display device having a backlight light source and the polarizing plate, the laminate having a first transparent base material film and a second transparent base material film, in which a Re of the first transparent base material film is 4,000 nm or more, the laminate is arranged for use such that an angle formed between a slow axis of the first transparent base material film and an absorption axis of the polarizing plate is 45°±20° and such that an angle formed between a slow axis of the second transparent base material film and the absorption axis of the polarizing plate is 90°±30° or 0°±30°, an angle formed between the slow axes of the first transparent base material film and the second
(Continued)

transparent base material film is neither 0° nor 90°, and the second transparent base material film is used by being arranged on the viewing side with respect to the first transparent base material film.

26 Claims, 2 Drawing Sheets

(51) Int. Cl.
| | |
|---|---|
| B32B 7/02 | (2019.01) |
| B32B 9/00 | (2006.01) |
| B32B 27/36 | (2006.01) |
| G02B 5/30 | (2006.01) |
| G06F 3/044 | (2006.01) |
| G02F 1/1333 | (2006.01) |
| G02F 1/1335 | (2006.01) |
| G02F 1/13363 | (2006.01) |

(52) U.S. Cl.
CPC ............ *G02B 5/30* (2013.01); *G02B 5/3033* (2013.01); *G02B 5/3083* (2013.01); *G02F 1/13338* (2013.01); *G02F 1/13362* (2013.01); *G02F 1/13363* (2013.01); *G02F 1/133528* (2013.01); *G02F 1/133602* (2013.01); *G06F 3/041* (2013.01); *G06F 3/044* (2013.01)

(58) Field of Classification Search
USPC .................................................. 349/99, 102
See application file for complete search history.

(56) References Cited

U.S. PATENT DOCUMENTS

| | | | | |
|---|---|---|---|---|
| 2008/0043332 A1* | 2/2008 | Chiba | ................ | G02B 5/3033 359/489.03 |
| 2008/0112048 A1* | 5/2008 | Katou | ................ | B29D 11/0073 359/487.02 |
| 2008/0143928 A1* | 6/2008 | Fukagawa | ......... | B32B 17/10018 349/96 |
| 2008/0246708 A1* | 10/2008 | Ishiguro | .............. | G02F 1/13318 345/87 |
| 2008/0284957 A1* | 11/2008 | Haruta | ..................... | C08K 5/10 349/117 |
| 2009/0185270 A1* | 7/2009 | Maezawa | ............. | G02B 5/3033 359/485.01 |
| 2009/0322698 A1* | 12/2009 | Hirakata | ............. | G02F 1/13394 345/173 |
| 2010/0231830 A1* | 9/2010 | Hirakata | ................ | G02B 1/105 349/85 |
| 2010/0277676 A1* | 11/2010 | Uwada | .................... | B32B 27/08 349/102 |
| 2011/0242462 A1* | 10/2011 | Hirakata | ................ | G02B 1/105 349/99 |
| 2012/0229732 A1 | 9/2012 | Koike et al. | | |
| 2013/0100378 A1 | 4/2013 | Murata et al. | | |
| 2015/0177876 A1* | 6/2015 | Ishii | ....................... | G06F 3/044 345/174 |
| 2015/0301385 A1 | 10/2015 | Tsunekawa | | |
| 2015/0301667 A1* | 10/2015 | Yano | ..................... | G06F 3/0412 345/173 |
| 2015/0309314 A1* | 10/2015 | Border | ............... | G02B 27/0172 345/8 |
| 2016/0178964 A1* | 6/2016 | Sakai | ................ | G02F 1/133536 345/592 |

FOREIGN PATENT DOCUMENTS

| | | |
|---|---|---|
| JP | 2014-016590 A | 1/2014 |
| WO | 2011/058774 A1 | 5/2011 |
| WO | 2011/077804 A1 | 6/2011 |
| WO | 2011/162198 A1 | 12/2011 |
| WO | 2014/069378 A1 | 5/2014 |

OTHER PUBLICATIONS

International Preliminary Report on Patentability with the translation of Written Opinion dated Oct. 17, 2017 issued by the International Bureau in PCT/JP2016/061709.
Office Action dated Aug. 28, 2018, issued by the Japan Patent Office in corresponding Japanese Application No. 2017-512527.

* cited by examiner

TRANSPARENT BASE MATERIAL FILM LAMINATE, TOUCH PANEL SENSOR FILM, TOUCH PANEL, IMAGE DISPLAY DEVICE, AND METHOD FOR IMPROVING VISIBILITY OF IMAGE DISPLAY DEVICE

CROSS-REFERENCE TO RELATED APPLICATIONS

This application is a Continuation of PCT International Application No. PCT/JP2016/061709, filed on Apr. 11, 2016, which claims priority under 35 U.S.C. Section 119(a) to Japanese Patent Application No. 2015-082030 filed on Apr. 13, 2015. Each of the above applications is hereby expressly incorporated by reference, in its entirety, into the present application.

BACKGROUND OF THE INVENTION

1. Field of the Invention

The present invention relates to a transparent base material film laminate, a touch panel sensor film, a touch panel, an image display device, and a method for improving the visibility of an image display device. More specifically, the present invention relates to a transparent base material film laminate capable of suppressing production loss, suppressing the occurrence of rainbow unevenness, and suppressing the occurrence of blackout, a touch panel sensor film, a touch panel, an image display device, and a method for improving visibility of an image display device.

2. Description of the Related Art

A touch panel is generally configured such that a pressure sensitive or electrostatic capacitive sensor and a front plate for achieving easy touch with a finger are arranged on a viewing side of an image display portion in an image display device such as a liquid crystal display device (LCD). An LCD performs display by causing a liquid crystal panel, in which a liquid crystal cell is sandwiched between two polarizing plates, to transmit or block the light from the outside or the light generated by a light source such as frontlight or backlight. As the backlight light source, fluorescent lamps such as cold cathode tubes or hot cathode tubes are generally used. The spectral distribution of fluorescent tubes such as cold cathode tubes or hot cathode tubes shows a light emission spectrum having a plurality of peaks. The combination of colors in such a discontinuous light emission spectrum provides a white light source. On the other hand, the applications of light emitting diodes, which consume low power, have been studied from the viewpoint of energy saving. In particular, white light emitting diodes (LEDs) have a more continuous and wider emission spectrum than that of fluorescent tubes, and also have an excellent luminous efficiency.

In recent years, it has been demanded that rainbow unevenness and blackout are suppressed in a touch panel in a case in which an observer wears polarized sunglasses.

For example, in a case of using a film as a transparent resin base material of a touch panel sensor for a liquid crystal display device, unevenness of different colors (also referred to as rainbow unevenness) occurs in a liquid crystal display device, particularly when observing a display screen in an oblique direction, and thus the display quality of the liquid crystal display device is deteriorated. This phenomenon is caused by the birefringence of the film base material.

In addition, for example, there is a case in which, in an environment such as outdoors in the strong sunlight, an observer views an image display portion of an LCD of a touch panel in a state of being wearing sunglasses having polarization properties to eliminate the glare. In this case, the observer views light having linearly polarized light emitted from the LCD through polarizing plates. Therefore, a phenomenon (blackout) that the screen may be viewed dark or may not be viewed depending on the angle formed between the absorption axis of a polarizing plate included in the LCD and the absorption axis of a polarizing plate such as sunglasses occurs.

In response to this, a method for suppressing rainbow unevenness and/or blackout when an observer wears polarized sunglasses by using a film having a high film in-plane retardation Re is known (refer to JP2011-107198A and JP2014-016590A).

JP2011-107198A discloses a method for improving visibility of an image display device used in a liquid crystal display device having at least a backlight light source, a liquid crystal cell, a polarizing plate that is arranged on a viewing side of the liquid crystal cell, by using a white light emitting diode as the backlight light source and disposing a polymer film having a retardation of 3,000 to 30,000 nm on the viewing side of the polarizing plate so as to form an angle of about 45° between an absorption axis of the polarizing plate and a slow axis of the polymer film.

JP2014-016590A discloses a touch panel sensor film formed by laminating a conductive pattern layer on a multilayer transparent resin base material formed by laminating a plurality of transparent resin base materials or between the layers of the multilayer transparent resin base material, in which the transparent resin base material has a retardation of 3,000 nm or more in the entire touch panel sensor film and a slow axis direction in which the refractive index is largest in a plane is arranged to form an angle of 45±10° with respect to an absorption axis of a polarizing plate to be arranged on an emission surface of a liquid crystal panel on which the touch panel sensor film is arranged.

In the configurations disclosed in JP2011-107198A and JP2014-016590A, rainbow unevenness is prevented by applying a polyester film having a high retardation at a certain degree to the transparent resin base material as described in JP2014-016590A. In addition, by effectively using an optical property of preventing rainbow unevenness by arranging the transparent resin base material such that the slow axis has an angle of 45±10°, in the entire touch panel sensor film, incidence rays of linearly polarized light can be emitted by light having a linearly polarized light component orthogonal to the incidence rays and thus blackout in a case of using polarized sunglasses is prevented.

SUMMARY OF THE INVENTION

As described in JP2014-016590A, in a touch panel, for example, in an electrostatic capacitive touch panel, it is considered that the use of a high retardation film as a support for a functional layer such as a transparent conductive film is suitable for a configuration to reduce the number of parts by integrally forming a member that suppresses rainbow unevenness and blackout and the transparent conductive film.

However, when the present inventors examined the production of an electrostatic capacitive touch panel by the methods described in JP2011-107198A and JP2014-016590A, it was found that the absorption axis of the polarizing plate used in the touch panel is typically arranged in a machine direction (which means, in a case of using a touch panel in a vertically erected manner like a touch panel mounted personal computer, a vertical direction) and/or a parallel direction with respect to each side of the image display portion of the touch panel in many cases. Therefore, in order to arrange the slow axis of the transparent conductive film in a direction inclined at 45° from the absorption axis of the polarizing plate, it was found that it is necessary to inevitably cut out the transparent conductive film into the shape of the touch panel (typically, quadrilateral shape) while being inclined at 45° with respect to the side of a long film, and to laminate the film. Since a film provided with a functional layer such as a transparent conductive film is very expensive, it was found that, in a case in which the transparent conductive film is cut out or punched while being inclined at 45° with respect to the side of a long film, the production loss at the time of cutting or punching is very significant and even considering the efficiency attributable to reducing the number of parts, this case does not commensurate with the production cost totally.

An object of the present invention to solve the above problems is to provide a transparent base material film laminate capable of suppressing production loss, suppressing the occurrence of rainbow unevenness, and suppressing the occurrence of blackout.

The present inventors have conducted intensive investigations to solve the above problems. As a result, the inventors have found that even in a case of using a transparent conductive film in which a conductive layer is formed on a support that is separately provided from a high retardation film without reducing the number of parts, the occurrence of rainbow unevenness and the occurrence of blackout cannot be suppressed only by laminating a member cut into a quadrilateral shape parallel and vertical to the side of the transparent conductive film in which the conductive layer is formed on the separate support and the high retardation film. That is, it has been found that the occurrence of rainbow unevenness and the occurrence of blackout cannot be suppressed by simply laminating these two films.

In this regard, when the present inventors have conducted further intensive investigations, it has found that the use of a first transparent base material film having a Re large enough to eliminate rainbow unevenness and blackout while being inclined at 45° with respect to an absorption axis of a polarizing plate eliminates the polarization of the light emitted from the polarizing plate and thus a polarization state in which rainbow unevenness and blackout can be suppressed is obtained. This is referred to as a first step of depolarization. In the first step of depolarization, it has been found that rainbow unevenness and blackout are suppressed to a certain degree.

However, it has been found that in a case in which an arbitrary second transparent base material film (a support of a functional layer such as a conductive layer) that is separately provided from the first transparent base material film having a large Re is arranged at a position closer to a backlight side than to the first transparent base material film, rainbow unevenness and blackout occur due to the second transparent base material film. It has been found that even in a case in which the light in a polarization state in which rainbow unevenness and blackout which have once occurred are caused passes through the first transparent base material film having a large Re, the occurrence of rainbow unevenness and blackout cannot be suppressed.

It has been also found that although the arbitrary second transparent base material film (the support of a functional layer such as a conductive layer) is arranged at a position closer to a viewing side than to the first transparent base material film, in all of the cases in which the slow axes of these films coincide with each other, the slow axis and the fast axis coincide with each other, and an angle formed by the slow axes of these films is excessively small or excessively large, even in a case in which the light which has passed through the first transparent base material film and undergone the first step of depolarization passes through the next second transparent base material film, rainbow unevenness and/or blackout occurs again.

Also, in a case of using a first transparent base material film having a Re not large enough to eliminate rainbow unevenness and blackout as the first transparent base material film, rainbow unevenness and blackout have occurred due to the first transparent base material film and the rainbow unevenness and blackout which have once occurred cannot be eliminated even through the second transparent base material film arranged on the viewing side according to the angle of the slow axis.

Based on the above investigations, the present inventors have found that by arranging a second transparent base material film that is provided separately from a first transparent base material film having Re large enough to eliminate rainbow unevenness and blackout on a viewing side while slow axes of the films are further inclined to about 45° with respect to the first transparent base material film, the degree of polarization of the light that has undergone the first step of depolarization through the first transparent base material film is changed into a direction in which rainbow unevenness and blackout can be further suppressed (further eliminated). This is referred to as a second step of depolarization. In the second step of depolarization, it has been found that the elimination of rainbow unevenness and blackout is kept, and thus the present invention has been accomplished.

The present invention which is specific means for achieving the object is as follows.

[1] A transparent base material film laminate that is used by being arranged on a viewing side of a polarizing plate of an image display device having at least a backlight light source and the polarizing plate that is arranged on a viewing side of the backlight light source, the transparent base material film laminate comprising:

at least a first transparent base material film and a second transparent base material film, in which a film in-plane retardation Re of the first transparent base material film is 4,000 nm or more, and the transparent base material film laminate is arranged for use such that an angle formed between a slow axis of the first transparent base material film and an absorption axis of the polarizing plate is 45°±20°, and such that an angle formed between a slow axis of the second transparent base material film and the absorption axis of the polarizing plate is 90°±30° or 0°±30°, an angle formed between the slow axes of the first transparent base material film and the second transparent base material film is neither 0° nor 90°, and the second transparent base material film is arranged on a viewing side with respect to the first transparent base material film.

[2] In the transparent base material film laminate according to [1], it is preferable that a film in-plane retardation Re of the second transparent base material film is larger than 0 nm and is smaller than the film in-plane retardation Re of the first transparent base material film.

[3] In the transparent base material film laminate according to [1] or [2], it is preferable that a ratio Re/Rth of the film in-plane retardation Re of the first transparent base material film and a retardation Rth of the first transparent base material film in a film thickness direction is 0.5 or more.

[4] In the transparent base material film laminate according to any one of [1] to [3], it is preferable that a retardation Rth of the second transparent base material film in a film thickness direction is 20,000 nm or less.

[5] In the transparent base material film laminate according to any one of [1] to [4], it is preferable that at least one of the first transparent base material film or the second transparent base material film is a polyester film.

[6] In the transparent base material film laminate according to any one of [1] to [5], it is preferable that the first transparent base material film is a uniaxially oriented polyester film.

[7] In the transparent base material film laminate according to any one of [1] to [6], it is preferable that the second transparent base material film is a biaxially oriented polyester film.

[8] In the transparent base material film laminate according to any one of [1] to [7], it is preferable that a thickness of the first transparent base material film is 40 μm or more.

[9] In the transparent base material film laminate according to any one of [1] to [8], it is preferable that a thickness of the second transparent base material film is 80 μm or less and is smaller than the thickness of the first transparent base material film.

[10] In the transparent base material film laminate according to any one of [1] to [9], it is preferable that the image display device has a liquid crystal cell between the backlight light source and the polarizing plate.

[11] In the transparent base material film laminate according to any one of [1] to [10], it is preferable that the second transparent base material film is a conductive film in which a conductive layer is formed.

[12] In the transparent base material film laminate according to [11], it is preferable that the conductive layer includes a plurality of fine metal wires.

[13] It is preferable that the fine metal wires in [12] are arranged in a mesh shape.

[14] It is preferable that the fine metal wires in [12] are randomly arranged.

[15] In the transparent base material film laminate according to any one of [12] to [14], it is preferable that the fine metal wire is formed of silver or an alloy including silver.

[16] In the transparent base material film laminate according to any one of [12] to [14], it is preferable that the fine metal wire is formed of copper or an alloy including copper.

[17] In the transparent base material film laminate according to [11], it is preferable that the conductive layer is formed of an oxide.

[18] In the transparent base material film laminate according to [17], it is preferable that the oxide is an indium oxide containing a tin oxide or a tin oxide containing antimony.

[19] In the transparent base material film laminate according to any one of [1] to [18], it is preferable that the first transparent base material film and the second transparent base material film are laminated through a pressure sensitive adhesive.

[20] In the transparent base material film laminate according to any one of [1] to [19], it is preferable that the backlight light source is a white light emitting diode of a fluorescence system.

[21] In the transparent base material film laminate according to any one of [1] to [20], it is preferable that the transparent base material film laminate has a quadrilateral shape and is arranged for use such that an angle formed between each side of the transparent base material film laminate and the absorption axis of the polarizing plate is 90°±30° or 0°±30°.

[22] In the transparent base material film laminate according to any one of [1] to [21], it is preferable that the transparent base material film laminate has a quadrilateral shape and an angle formed between each side of the transparent base material film laminate and the slow axis of the second transparent base material film is 90°±30° or 0°±30°.

[23] A touch panel sensor film comprising: the transparent base material film laminate according to any one of [1] to [22].

[24] A touch panel comprising: the transparent base material film laminate according to any one of [1] to [22].

[25] An image display device comprising: the transparent base material film laminate according to any one of [1] to [22].

[26] A method for improving visibility of an image display device having at least a backlight light source and a polarizing plate that is arranged on a viewing side of the backlight light source, the method comprising:
arranging the transparent base material film laminate according to any one of [1] to [22] on a viewing side of the polarizing plate,
in which the transparent base material film laminate has at least a first transparent base material film and a second transparent base material film,
a film in-plane retardation Re of the first transparent base material film is 4,000 nm or more,
the transparent base material film laminate is arranged for use such that an angle formed between a slow axis of the first transparent base material film and an absorption axis of the polarizing plate is 45°±20°, and
such that an angle formed between a slow axis of the second transparent base material film and the absorption axis of the polarizing plate is 90°±30° or 0°±30°,
an angle formed between the slow axis of the first transparent base material film and the slow axis of the second transparent base material film is neither 0° nor 90°, and
the second transparent base material film is used by being arranged on a viewing side with respect to the first transparent base material film.

According to the configuration of the present invention, it is possible to provide a transparent base material film laminate capable of suppressing production loss, suppressing the occurrence of rainbow unevenness, and suppressing the occurrence of blackout.

DESCRIPTION OF THE PREFERRED EMBODIMENTS

Figure 1:
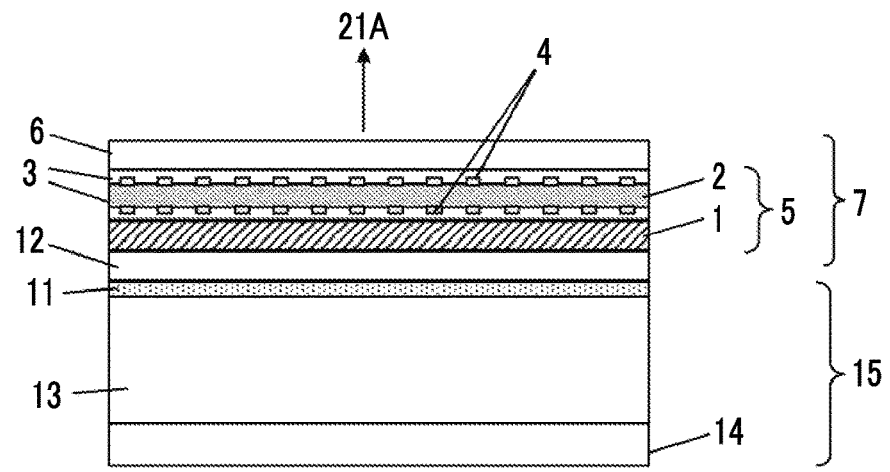
FIG. 1 is a schematic view of a cross section of an example of an image display device according to the present invention.

Hereinafter, the present invention will be described in detail. The description of constitutional requirements described below is made based on representative embodiments and specific examples of the present invention. However, the present invention is not limited to these embodiments. In the specification, the expression "to" is used as a meaning of including numerical values described before and after the expression as a minimum value and a maximum value.

In addition, although described later, it is preferable that in a method for producing a transparent base material film, a first transparent base material film and a second transparent base material film are typically obtained by transporting the film by a roll or the like and stretching the film. At this time, the transport direction of the film is also referred to as a machine direction (MD). Further, the MD direction of the film is also referred to as a longitudinal direction of the film. The film width direction is a direction orthogonal to the longitudinal direction. The film width direction is also referred to as a transverse direction (TD) with respect to the film produced while being transporting the film.

The transparent base material film laminate, the first transparent base material film, the second transparent base material film, and the transparent conductive layer, and the like being "transparent" means that the light transmittance measured based on the method described in JIS-K-7361 is 60% or higher. The light transmittance of the first transparent base material film is more preferably 80% or higher and particularly preferably 85% or higher. In a case in which the second transparent base material film has a conductive layer, the visible light transmittance of the transparent base material film laminate, the second transparent base material film, and the transparent conductive layer is mainly determined by the light transmittance of the conductive layer in some cases. The light transmittance of the conductive layer is more preferably 70% or higher and particularly preferably 75% or higher.

[Transparent Base Material Film Laminate]

A transparent base material film laminate of the present invention is a transparent base material film laminate that is used by being arranged on a viewing side of a polarizing plate of an image display device having at least a backlight light source and the polarizing plate that is arranged on a viewing side of the backlight light source, the transparent base material film laminate has at least a first transparent base material film and a second transparent base material film.

a film in-plane retardation Re of the first transparent base material film is 4,000 nm or more, the transparent base material film laminate is arranged for use such that an angle formed between a slow axis of the first transparent base material film and an absorption axis of the polarizing plate is 45°±20°, and such that an angle formed between a slow axis of the second transparent base material film and the absorption axis of the polarizing plate is 90°±30° or 0°±30°, an angle formed between the slow axes of the first transparent base material film and the second transparent base material film is neither 0° nor 90°, and the second transparent base material film is used by being arranged on a viewing side with respect to the first transparent base material film.

By adopting this configuration, the transparent base material film laminate of the present invention makes it possible to suppress production loss, to suppress the occurrence of rainbow unevenness, and to suppress the occurrence of blackout.

Hereinafter, preferable embodiments of the transparent base material film laminate, a touch panel sensor film, a touch panel, an image display device, and a method for improving the visibility of an image display device according to the present invention will be described in detail.

<Configuration of Transparent Base Material Film Laminate>

First, the configuration of the transparent base material film laminate of the present invention will be described using the drawings. The configuration of the transparent base material film laminate of the present invention is not limited by the drawings.

FIG. 1 is a schematic view of a cross section of an example of an image display device according to the present invention.

A transparent base material film laminate 5 of the present invention shown in FIG. 1 is a transparent base material film laminate used by being arranged on a viewing side 21A of a polarizing plate of an image display device 15 having at least a backlight light source 14 and the polarizing plate 11 that is arranged on a viewing side of the backlight light source, and the transparent base material film laminate 5 has at least a first transparent base material film 1 and a second transparent base material film 2.

In the transparent base material film laminate of the present invention, it is preferable that the backlight light source is a white light emitting diode of a fluorescence system. The backlight light source preferably has a substantially continuous light emitting spectrum and in this case, particularly, the transparent base material film laminate of the present invention makes it possible to suppress production loss, to suppress the occurrence of rainbow unevenness, and to suppress the occurrence of blackout.

(Arrangement of Each Member)

For the transparent base material film laminate of the present invention shown in FIG. 1, it is preferable that the image display device 15 has a liquid crystal cell 13 between the backlight light source 14 and the polarizing plate 11. In a case in which the image display device has two polarizing plates (not shown in FIG. 1), it is preferable that the transparent base material film laminate of the present invention is used by being further arranged on a viewing side of the polarizing plate on the viewing side of the image display device.

It is preferable that the transparent base material film laminate 5 of the present invention is laminated on the polarizing plate 11 of the image display device 15 of the present invention through an adhesive 12.

The transparent base material film laminate may have members other than the first transparent base material film and the second transparent base material film. It is preferable that in the transparent base material film laminate 5 of the present invention shown in FIG. 1, the first transparent base material film 1 and the second transparent base material film 2 are laminated through a pressure sensitive adhesive 3.

In a case in which the transparent base material film laminate is used for a touch panel, it is preferable that the second transparent base material film 2 in the transparent base material film laminate 5 of the present invention has a conductive layer 4 in a touch panel 7 of the present invention shown in FIG. 1. In a case in which the second transparent base material film 2 has the conductive layer 4, the transparent base material film laminate can be suitably used for a touch panel sensor film.

It is preferable that the touch panel 7 of the present invention shown in FIG. 1 further has a front plate 6. As the front plate, a glass substrate or cover plastic is preferable. In addition, it is preferable that the front plate 6 and the second transparent base material film 2 are laminated through the pressure sensitive adhesive 3.

As shown in FIG. 1, the conductive layer 4 may be partially formed in a pattern shape or mesh shape. The conductive layer may be formed in a layered manner by covering the entire surface of the second transparent base material film 2.

—Arrangement of Second Transparent Base Material Film—

Figure 2:
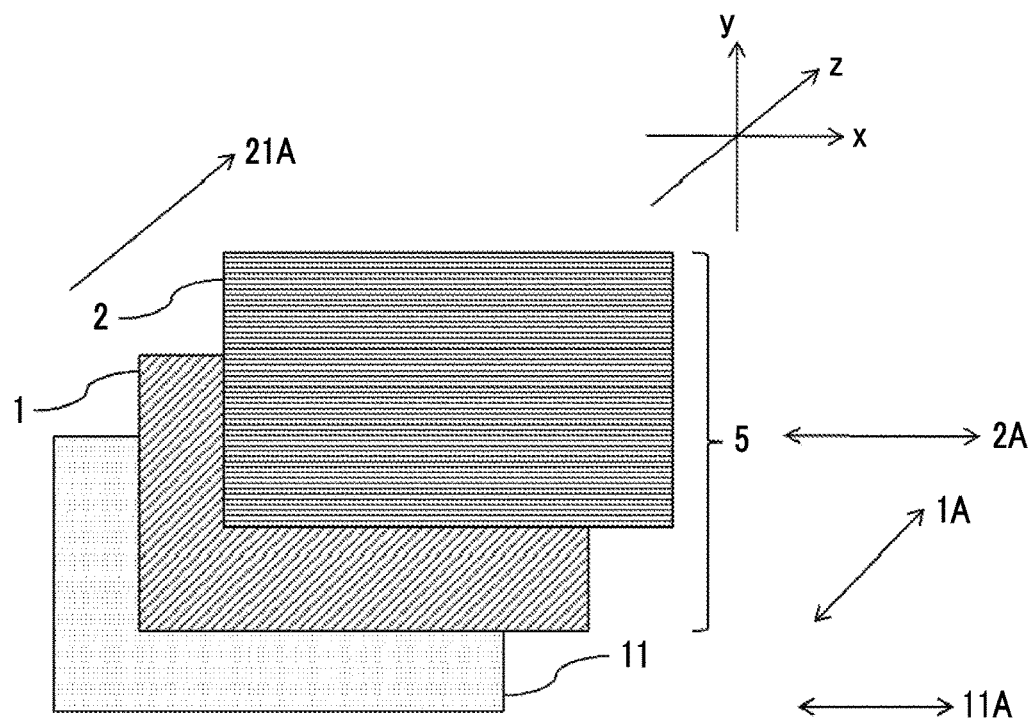
FIG. 2 is a view illustrating the order of lamination of a polarizing plate, a first transparent base material film, and a second transparent base material film in the example of the image display device of the present invention.

FIG. 2 is a view illustrating the order of lamination of the polarizing plate, the first transparent base material film, and the second transparent base material film in the example of the image display device of the present invention.

The transparent base material film laminate 5 of the present invention is used by arranging the second transparent base material film 2 on the viewing side 21A with respect to the first transparent base material film 1. In a case in which the second transparent base material film is used by being arranged on the viewing side with respect to the first transparent base material film, the occurrence of rainbow unevenness can be suppressed. In the example of the image display device of the present invention shown in FIG. 2, all of a direction 1A of the slow axis of the first transparent base material film, a direction 2A of the slow axis of the second transparent base material film, and a direction 11A of the absorption axis of the polarizing plate are present in an xy plane, and a direction 21A of the viewing side 21A is a positive direction of a z axis. In general, the direction 11A of the absorption axis of the polarizing plate in the image display device is a horizontal direction with respect to the image display portion (display screen) of the image display device, that is, a y-axis direction in many cases and may be a vertical direction, that is, an x-axis direction. In general, in the image display device, the side of the image display portion (display screen) of the image display device in the horizontal direction coincides with the y-axis direction and the side of the image display portion in the vertical direction coincides with the x-axis direction.

Figure 3:
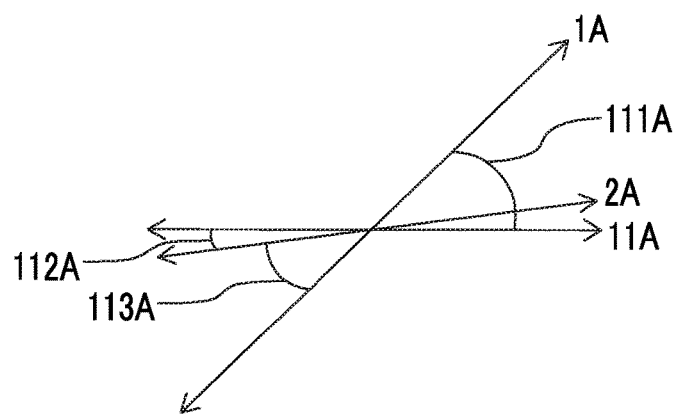
FIG. 3 is a view illustrating relationships of angles formed by slow axes of the transparent base material films and an absorption axis of the polarizing plate in the example of the image display device of the present invention.

(Arrangement of Slow Axis of First Transparent Base Material Film, Slow Axis of Second Transparent Base Material Film, and Absorption Axis of Polarizing Plate) FIG. 3 is a view illustrating relationships of angles formed by the slow axes of the transparent base material films and the absorption axis of the polarizing plate in the example of the image display device of the present invention.

In the transparent base material film laminate of the present invention, an angle 113A formed between the slow axis of the first transparent base material film and the slow axis of the second transparent base material film is neither 0° nor 90°. The angle 113A formed between the slow axis of the first transparent base material film and the slow axis of the second transparent base material film is preferably 1° to 89°, more preferably 10° to 80°, particularly preferably 20° to 70°, more particularly preferably 30° to 60°, and most preferably 45°. As long as the angle 113A formed between the slow axis of the first transparent base material film and the slow axis of the second transparent base material film is neither 0° nor 90°, the Re of the first transparent base material film and the Re of the second transparent base material film are not simply added together and the Rth of the first transparent base material film and the Rth of the second transparent base material film are not simply added together. Therefore, the first step of depolarization and second step of depolarization can be carried out. As the angle 113A formed between the slow axis of the first transparent base material film and the slow axis of the second transparent base material film approaches 45°, rainbow unevenness and blackout can be suppressed by the first step of depolarization and the second step of depolarization and thus this case is preferable.

The transparent base material film laminate 5 of the present invention is used by arranging the first transparent base material film and the polarizing plate such that an angle 111A formed between the slow axis of the first transparent base material film and the absorption axis of the polarizing plate shown in FIG. 3 is 45°±20°. The angle 111A formed between the slow axis of the first transparent base material film and the absorption axis of the polarizing plate is preferably 45°±15°, more preferably 45°±10°, and even more preferably 45°±5°. In a case in which the angle 111A formed between the slow axis of the first transparent base material film and the absorption axis of the polarizing plate is 45°±200, the first step of depolarization is easily carried out and thus the occurrence of rainbow unevenness and blackout is easily suppressed.

The transparent base material film laminate 5 of the present invention is used by arranging the second transparent base material film and the polarizing plate such that such that an angle 112A formed between the slow axis of the second transparent base material film and the absorption axis of the polarizing plate shown in FIG. 3 is 90°±30° or 0°±30°. The angle formed between the slow axis of the second transparent base material film and the absorption axis of the polarizing plate is preferably 90°±15° or 0°±15° and more preferably 90°±7° or 0°±7°. In a case in which the angle 112A formed between the slow axis of the second transparent base material film and the absorption axis of the polarizing plate is 90°±30° or 0°±30°, the second step of depolarization is easily carried out and the occurrence of the rainbow unevenness and blackout is easily suppressed. Further, in the case in which the angle 112A formed between the slow axis of the second transparent base material film and the absorption axis of the polarizing plate is 90°±30° or 0°±30°, the transparent base material film laminate of the present invention can be used by cutting the second transparent base material film into a desired shape by inclining the second transparent base material film with respect to the side of the long second transparent base material film at 90°±30° or 0°±30°, and thus production loss is suppressed.

(Arrangement in Case in which Transparent Base Material Film Laminate has Quadrilateral Shape)

Regarding the transparent base material film laminate of the present invention, the transparent base material film laminate (orthographic projection) when viewed from the viewing side preferably has a quadrilateral shape and more preferably has a rectangular shape.

As shown in FIG. 2, it is preferable that the transparent base material film laminate 5 of the present invention has a quadrilateral shape and is used by arranging the transparent base material film laminate and the polarizing plate such that angle formed between each side of the transparent base material film laminate 5 (each side of the first transparent base material film 1 and each side of the second transparent base material film 2) and the direction 11A of the absorption axis of the polarizing plate is 90°±30° or 0°±30°. A preferable range of the angle formed between each side of the transparent base material film laminate and the absorption axis of the polarizing plate is the same as the preferable range of the angle formed between the slow axis of the second transparent base material film and the absorption axis of the polarizing plate, which will be described later.

As shown in FIG. 2, it is preferable that the transparent base material film laminate 5 of the present invention has a quadrilateral shape and an angle formed between each side of the transparent base material film laminate 5 (each side of the first transparent base material film 1 and each side of the second transparent base material film 2) and the direction 2A of the slow axis of the second transparent base material film is 90°±30° or 0°±30°. A preferable range of the angle formed between each side of the transparent base material film laminate and the slow axis of the second transparent base material film is the same as the preferable range of the angle formed between the slow axis of the second transparent base material film and the absorption axis of the polarizing plate, which will be described later.

<Characteristics of First Transparent Base Material Film>
(Phase Difference)

In the transparent base material film laminate of the present invention, a film in-plane retardation Re of the first transparent base material film is 4,000 nm or more. Re represents the film in-plane retardation and the unit thereof is nm.

The film in-plane retardation Re of the first transparent base material film is preferably 6,000 nm or more and more preferably 8,000 nm or more. In a case in which the Re of the first transparent base material film is 4,000 nm or more, the first step of depolarization is easily carried out and thus rainbow unevenness can be sufficiently suppressed.

A retardation Rth of the first transparent base material film in a thickness direction is preferably 3,000 to 30,000 nm, more preferably 3,500 to 2,5000 nm, and even more preferably 4,000 to 20,000 nm. It is difficult to prepare a film having a Rth of less than 3,000 nm in principle. In a case in which the Rth is 30,000 nm or less, the first step of depolarization is easily carried out and rainbow unevenness hardly occurs. Thus, this case is preferable.

In the transparent base material film laminate of the present invention, a ratio Re/Rth of the film in-plane retardation Re of the first transparent base material film and the retardation Rth of the first transparent base material film in the thickness direction is preferably 0.5 or more.

The ratio Re/Rth of the first transparent base material film is preferably 0.7 or more and is more preferably 0.8 or more. In a case in which the ratio is 0.5 or more, the first step of depolarization is easily carried out and rainbow unevenness hardly occurs.

Rainbow unevenness can be reduced by setting a Nz factor which represents a relationship between Re and Rth to have an appropriate value. From the viewpoint of the effect of reducing rainbow unevenness and production suitability, the absolute value of the Nz factor is preferably 2.5 or less, more preferably 0.5 to 2.0, and even more preferably 0.5 to 1.7.

Since the rainbow unevenness occurs due to incidence rays, the rainbow unevenness is typically observed during while display.

The film in-plane retardation Re of the first transparent base material film and the film in-plane retardation Re of the second transparent base material film, which will be described later, are represented by Equation (14).

$$Re=(nx-ny) \times y_1 \qquad (14)$$

Here, nx represents a refractive index in the in-plane slow axis direction of the film, ny represents a refractive index in the in-plane fast axis direction of the film (the direction orthogonal to the in-plane slow axis direction), and $y_1$ represents the thickness of the film.

The retardation Rth of each of the first transparent base material film and the second transparent base material film, which will be described later, in the film thickness direction is represented by Equation (15).

$$Rth=\{(nx+ny)/2-nz\} \times y_1 \qquad (15)$$

Here, nz represents the refractive index of the first transparent base material film in the film thickness direction.

The Nz factor of the first transparent base material film is represented by Equation (16).

$$Nz=(nx-nz)/(nx-ny) \qquad (16)$$

In the specification, Re, Rth, and Nz at a wavelength of λ nm can be measured in the following manner.

The orientation axis directions of the first transparent base material film were obtained by using two polarizing plates, and the first transparent base material film was cut to a rectangular shape having a size of 4 cm×2 cm so that the orientation axis directions were orthogonal to each other, thereby preparing a measurement sample. For this sample, the refractive indexes (nx and ny) of the two orthogonal axes and the refractive index (nz) in the thickness direction were obtained by using an Abbe refractometer (NAR-4T, manufactured by Atago Co., Ltd., a measurement wavelength of 589 nm), and the absolute value (|nx−ny|) of the difference in refractive index between the two axes was used as the anisotropy (Δnxy) of the refractive index. The thickness $y_1$ (nm) of the first transparent base material film was as measured by using an electric micrometer (MILLITRON 1245D, manufactured by Fine Ryuf Co., Ltd.) and the unit was converted into nm. Re, Rth, and Nz were respectively calculated from the measured values of nx, ny, nz, and $y_1$.

The Re and Rth can be adjusted to have desired values by using the kind of resin used for the film, the amounts of the resin and additives, the addition of a retardation developing agent, the film thickness of the film, and the stretching direction and stretch ratio of the film.

A method for controlling the Re and Rth of the first transparent base material film to be in the ranges of the Re and Rth is not particularly limited and for example, the Re and Rth of the first transparent base material film can be controlled to be in the above ranges by a stretching method.

(Thickness)

In the transparent base material film laminate of the present invention, the thickness of the first transparent base material film is preferably 40 μm or more. The thickness of the first transparent base material film is preferably 60 μm or more and more preferably 80 μm or more. In a case in which the thickness of the film is 40 μm or more, the optical properties are easily obtained and rainbow unevenness and blackout are easily suppressed.

The thickness t of the first transparent base material film and the second transparent base material film, which will be described later, was measured by using a contact type film thickness meter by selecting 50 sample points at equal intervals of 0.5 m in a direction of machine-direction stretching (longitudinal direction), further selecting 50 sample points at equal intervals (50 equally divided points in the width direction) across the entire width of the film in the width direction of the film (the direction orthogonal to the longitudinal direction), and then measuring the thickness at these 100 points. The average thickness of these 100 points was obtained and then considered as the thickness of the film.

(Refractive Index and Degree of Crystallinity)

In the transparent base material film laminate of the present invention, it is preferable that the first transparent base material film is a uniaxially oriented polyester film. In a case in which the uniaxially oriented polyester film is used as the first transparent base material film, the optical properties are easily obtained and rainbow unevenness and blackout are easily suppressed.

Whether or not the first transparent base material film is a uniaxially oriented polyester film can be confirmed from the refractive index and the degree of crystallinity of the film of the film. Specifically, it is preferable that the smaller refractive index of the refractive indices of the first transparent base material film of the present invention in the longitudinal direction and the width direction is 1.610 or less, the larger refractive index of the refractive indices in the longitudinal direction and the width direction is 1.670 or more, and the degree of crystallinity is more than 5%.

A preferable range of the smaller refractive index of the refractive indices in the longitudinal direction and the width direction of the first transparent base material film is preferably 1.610 or less, more preferably 1.605 or less, and even more preferably 1.600 or less.

A preferable range of the larger refractive index of the refractive indices in the longitudinal direction and the width direction of the first transparent base material film is preferably 1.670 or more, more preferably 1.680 or more, and even more preferably 1.690 or more.

In addition, a difference between the larger refractive index of the refractive indices in the longitudinal direction and the width direction of the first transparent base material film and the smaller refractive index of the refractive indices in the longitudinal direction and the width direction of the first transparent base material film is preferably 0.060 or more, more preferably 0.070 or more, even more preferably 0.080 or more, and most preferably 0.090 or more.

The degree of crystallinity of the first transparent base material film is preferably 5% or more, more preferably 15% or more, even more preferably 20% or more, and most preferably 25% or more.

<Material of First Transparent Base Material Film, Layer Configuration, and Surface Treatment>

The material of the first transparent base material film is not particularly limited as long as the range of Re is not contrary to the gist of the present invention and known resins or materials can be used.

The resin used for the first transparent base material film and the second transparent base material film, which will be described later, of the transparent base material film laminate of the present invention is not particularly limited and a resin film formed by using a known resin can be used. Examples of the resin include polyesters and polycarbonates. Among these, it is preferable that at least one of the first transparent base material film or the second transparent base material film, which will be described later, of the transparent base material film laminate of the present invention is a polyester film. The polyester film refers to a film including a polyester resin. Examples of the polyester resins include polyethylene terephthalate, polyethylene naphthalate, and polybutylene terephthalate. Among these, polyethylene terephthalate is preferable. In a case of using a polyester resin, the optical properties of the first transparent base material film and the second transparent base material film, which will be described later, are easily obtained and rainbow unevenness and blackout are easily suppressed.

In a case in which the first transparent base material film is a polyester film, the first transparent base material film may be a single layer film of a layer including a polyester resin as a main component (the mass ratio of the resin in the entire film is 50% by mass or more) and may be a multilayer film having at least one layer including a polyester resin as a main component. In addition, either or both of these unit layer film and multilayer film may be subjected to surface treatment. The surface treatment may be surface modification using corona treatment, saponification treatment, heat treatment, ultraviolet irradiation, electron beam irradiation, and the like and may be film formation using application or vapor deposition of a polymer, a metal, and the like. The mass ratio of the resin in the entire film is typically 50% by mass or more, preferably 70% by mass or more, and more preferably 90% by mass or more.

It is preferable that an easily adhesive layer is laminated on at least one surface of the first transparent base material film. It is more preferable that the easily adhesive layer contains particles and the height of the particles protruding from the surface of the easily adhesive layer is equal to or more than the thickness of the easily adhesive layer.

The height of the above particles protruding from the surface of the easily adhesive layer is an average value of heights measured at 5 points in a square meter of the easily adhesive layer.

In a case in which the height of the particles that are contained in the easily adhesive layer and protrude from the surface of the easily adhesive layer is lower than the thickness of the easily adhesive layer (preferably the coating layer), slidability is deteriorated and thus wrinkles are easily generated.

The kind of the particle is not particularly limited. Specific examples of the particles include particles of silica, calcium carbonate, magnesium carbonate, barium carbonate, calcium sulfate, calcium phosphate, magnesium phosphate, kaolin, aluminum oxide, titanium oxide, include zirconium oxide, preferably silica, aluminum oxide, titanium oxide, and zirconium oxide, and the like. Preferable are particles of silica, aluminum oxide, titanium oxide, and zirconium oxide. In addition, heat resistance organic particles described in JP1984-5216B (JP-S59-5216B), JP1984-217755A (JP-S59-217755A), and the like may be used. Examples of other heat resistance organic particles include thermosetting urea resins, thermosetting phenol resins, thermosetting epoxy resins, and benzoguanamine resins.

Regarding the particle diameter, it is preferable that the easily adhesive layer has such a particle diameter that the height of the particles protruding from the surface of the easily adhesive layer is equal to or more than the thickness of the easily adhesive layer. It is preferable to use particles of which the average primary particle diameter is adjusted. As a result, the particles are particles agglomerated such that the height of the particles protruding from the surface of the easily adhesive layer is equal to or more than the thickness of the easily adhesive layer. In a case of using the agglomerated particles, the height of the particles protruding from the surface of the easily adhesive layer can be confirmed by measuring the average secondary particle diameter.

(1-1) Polyester Resin

As the polyester, those having compositions described in paragraph [0042] of WO2012/157662A are preferably used.

As the polyester, polyethylene terephthalate (PET), polyethylene naphthalate (PEN), polybutylene terephthalate, polycyclohexanedimethylene terephthalate, and the like can be used. From the viewpoint of costs and heat resistance, PET and PEN are more preferable and PET is even more preferable (in a case of using PEN, Re/Rth is likely to be slightly reduced).

As the polyester, polyethylene terephthalate is most preferable. However, polyethylene naphthalate can be also used and for example, those described in JP2008-39803A can be preferably used.

Polyethylene terephthalate is a polyester having a constitutional unit derived from terephthalic acid as a dicarboxylic acid component and a constitutional unit derived from ethylene glycol as a diol component. It is preferable that ethylene terephthalate accounts for 80 mol % or more of all repeating units of the polyethylene terephthalate. The polyethylene terephthalate may contain constitutional units derived from other copolymerization components. Examples of other copolymerization components include dicarboxylic acid components such as isophthalic acid, para-β-oxyethoxy benzoic acid, 4,4'-dicarboxy diphenyl, 4,4'-dicarboxy benzophenone, bis(4-carboxyphenyl) ethane, adipic acid, sebacic acid, 5-sodium sulfoisophthalic acid, and 1,4-dicarboxy cyclohexane, and diol components such as propylene glycol, butanediol, neopentyl glycol, diethylene glycol, cyclohexane diol, an ethylene oxide adduct of bisphenol A, polyethylene glycol, polypropylene glycol, and polytetramethylene glycol. These dicarboxylic acid components and diol components can be used in combination of two or more thereof as required. In addition, an oxycarboxylic acid such as para-oxybenzoic acid can be used together with the dicarboxylic acid components and diol components. As other copolymerization components, dicarboxylic acid components and/or diol components containing a small number of amide bonds, urethane bonds, ether bonds, carbonate bonds, and the like may also be used. As a method for producing polyethylene terephthalate, a so-called direct polymerization method in which terephthalic acid, ethylene glycol, and, as required, other dicarboxylic acids and/or other diols are directly reacted with each other or a so-called ester-exchange reaction method in which a dimethyl ester of terephthalic acid, ethylene glycol, and, as required, dimethyl esters of other dicarboxylic acids and/or other diols are ester-exchange-reacted with each other can be applied.

(1-2) Physical Properties of Polyester Resin (1-2-1) Intrinsic Viscosity

The intrinsic viscosity IV of the polyester resin is preferably 0.5 or more and 0.9 or less, more preferably 0.52 or more and 0.8 or less, and even more preferably 0.54 or more and 0.7 or less. In order to obtain such IV, when the polyester resin is synthesized, solid phase polymerization may be used together with melt polymerization, which will be described later.

(1-2-2) Acetaldehyde Content

The acetaldehyde content of the polyester resin is preferably 50 ppm (parts per million) or less. The acetaldehyde content is more preferably 40 ppm or less and particularly preferably 30 ppm or less. Acetaldehyde easily undergoes a condensation reaction between acetaldehyde molecules, water is generated as a side reaction product, and the water may cause hydrolysis of the polyester to proceed. The lower limit of the acetaldehyde content is about 1 ppm in practice. In order to set the acetaldehyde content to be in the above range, the following methods can be employed: a method of keeping the oxygen concentration low in each step of melt polymerization, solid phase polymerization and the like during production of a resin; a method of keeping the oxygen concentration low during storage and drying of a resin; a method of lowering a heat history imposed on a resin in an extruder, a melt pipe, a die and the like during production of a film; and a method of ensuring that shear is not locally intensified by a screw structure and the like of an extruder during melting.

—Catalyst—

In the polymerization of the polyester, a Sb-based, Ge-based, Ti-based, or Al-based catalyst is used, and preferable is a Sb-based, Ti-based, or Al-based catalyst and more preferable is a Ti-based catalyst.

That is, it is preferable that the polyester film of the present invention is obtained by polymerizing the polyester using a catalyst containing titanium atoms.

The use of a Ti-based catalyst makes it possible to obtain a polyester film capable of improving the display quality of a display device in a case in which the polyester film is incorporated in an image display device compared to a case of using another catalyst (for example, Sb-based catalyst). This is assumed to be based on the following reason.

Since the Ti-based catalyst has high catalytic activity, the required amount of the catalyst to be added is small. In addition, since the reaction occurs under reduction, the precipitation of foreign substances after titanium oxide is formed hardly occurs. Therefore, the fact that the amount of catalyst-induced foreign substances is small and defect failure hardly occurs is the reason that the display quality of an image display device can be improved.

Ti-Based Catalyst:

As the Ti-based catalyst, those described in paragraphs [0063] to [0090] of JP2013-47317A can be employed for use, and the contents described in this publication are incorporated in the specification. Among these, as the Ti-based catalyst, titanium alkoxides such as tetra-n-propyl titanate, tetra-i-propyl titanate, tetra-n-butyl titanate, tetra-n-butyl titanate tetramer, tetra-t-butyl titanate, tetracyclohexyl titanate, tetraphenyl titanate, and tetrabenzyl titanate, titanium oxides obtainable by hydrolysis of titanium alkoxides, titanium-silicon or zirconium complex oxides obtainable by hydrolysis of mixtures of titanium alkoxides and silicon alkoxides or zirconium alkoxides, titanium acetate, titanium oxalate, titanium potassium oxalate, titanium sodium oxalate, potassium titanate, sodium titanate, a mixture of titanic acid-aluminum hydroxide, titanium chloride, a mixture of titanium chloride-aluminum chloride, titanium acetylacetonate, and organic chelated titanium complexes employing an organic acid as a ligand, and the like are preferably used.

A method for polymerizing the polyester resin by using the Ti-based catalyst is not particularly limited and specifically, polymerization can be carried out according to paragraphs [0063] to [0111] of JP2013-47317A.

The amount of the Ti-based catalyst is preferably 1 to 50 ppm, more preferably 2 to 30 ppm, and even more preferably 3 to 15 ppm in terms of the amount of Ti element with respect to the mass of the polyester.

Al-Based Catalyst:

As the Al-based catalyst, those described in paragraphs [0013] to [0148] of WO2011/040161A (paragraphs [0021] to [0123] of US2012/0183761B) can be employed for use, and the contents described in this publication are incorporated in the specification.

A method for polymerizing the polyester resin by using the Al-based catalyst is not particularly limited and specifically, by employing the method described in paragraphs [0091] to [0094] of WO2012/008488A (paragraphs [0144] to [0153] of US2013/0112271B), polymerization can be carried out according to this publication. The contents described in these publications are incorporated in the specification.

By employing, for example, the contents of paragraphs [0052] to [0054] and [0099] to [0104] of JP2012-122051A (paragraphs [0045] to [0047] and [0091] to [0096] of WO2012/029725A), such an Al-based catalyst can be prepared according to these publications.

The contents described in these publications are incorporated in the specification. The amount of the Al-based catalyst is preferably 3 to 80 ppm, more preferably 5 to 60 ppm, and even more preferably 5 to 40 ppm in terms of the amount of Al element with respect to the mass of the polyester resin.

Sb-Based Catalyst:

As the Sb-based catalyst, those described in paragraphs [0050] and [0052] to [0054] of JP2012-41519A can be used.

A method for polymerizing the polyester resin by using the Sb-based catalyst is not particularly limited. Specifically, polymerization can be carried out according to paragraphs [0086] to [0087] of WO2012/157662A.

(1-3) Additives:

Known additives are preferably added to the first transparent base material film. Examples thereof include an ultraviolet absorber, particles, a lubricant, an anti-blocking agent, a heat stabilizer, an antioxidant, an antistatic agent, a light resistant agent, an impact resistance improving agent, a lubricant, a dye, and a pigment. Since the first transparent base material film is generally required to have transparency, it is preferable to minimize the amount of additives to be added.

In a case of the first transparent base material film having a multilayer structure, at least three-layer structure is preferable.

Other additives may be added to the first transparent base material film. For example, those described in paragraph [0058] of WO2012/157662A can be employed for use, and the contents described in this publication are incorporated in the specification.

<Method for Producing First Transparent Base Material Film>

A method for producing the first transparent base material film is not particularly limited and known methods can be employed. Among these, the method for producing the first transparent base material film is preferably a method for producing a uniaxially oriented film. Positive stretching is preferably carried out in only one direction, and positive stretching is more preferably carried out in only a TD direction.

The method for producing the first transparent base material film is preferably a method for producing a first transparent base material film by using a tenter type stretching apparatus having clips that travel along a pair of rails provided on both sides of the film transport path, including a process of stretching a substantially unstretched film (preferably a substantially unstretched polyester film) in a transverse direction while the film is being gripped by the clips, and a thermal fixing process of heating the film after cross-direction stretching to the highest temperature in the tenter. In the method for producing the first transparent base material film, the cross-direction stretching ratio in the cross-direction stretching process is preferably controlled to be in a range of 3.3 times or more and 4.8 times or less. In the method for producing the first transparent base material film, it is preferable to keep the film surface temperature at the time of the start of stretching in a range of 80° C. or higher and 95° C. or lower, to keep the film surface temperature at the time of the end of stretching in a range of 90° C. or higher and 105° C. or lower, and to gradually increase the film surface temperature during a period from the start of stretching to the end of stretching in the cross-direction stretching process.

Here, the expression "substantially unstretched polyester film" refers to a polyester film of which the refractive index in both the MD direction and the TD direction is 1.590 or less, and the substantially unstretched polyester film includes, a polyester film of which, for example, even in a case of slightly stretching the film in the MD direction, the refractive index in the MD direction and the TD direction is 1.590 or less, and the like.

Hereinafter, a preferable embodiment of the method for producing the first transparent base material film will be described.

(Melt-Kneading)

The substantially unstretched film is preferably molded into a film shape by melting and extruding a resin.

It is preferable that after a resin or a masterbatch of a resin and an additive produced by a masterbatch method is dried to have a moisture content of 200 ppm or less, the resultant is introduced into a uniaxial or biaxial extruder and melted. At this time, in order to suppress the decomposition of the resin, it is preferable to melt the resin in nitrogen or in vacuum. For the detailed conditions, the conditions described in paragraphs [0051] to [0052] of JP4962661B (paragraphs [0085] to [0086] of US2013/0100378B) are employed and melt kneading can be carried out according to these publications, the contents of which are incorporated in the specification. Further, it is also preferable to use a gear pump for improving the feed accuracy of the molten resin (melt). In addition, it is also preferable to use a filter having an opening size of 3 μm to 20 μm for removing foreign substances.

(Extrusion and Co-Extrusion)

The melt including the melt-kneaded resin is preferably extruded from a die. The melt may be extruded in a single layer or multi layers. In a case in which the melt is extruded in multi layers, for example, a layer containing an additive and a layer not containing an additive may be laminated, and a three-layer structure in which an additive is used as an inner layer is preferable since the bleed out of the additive is suppressed.

The bleed out of the additive is not preferable since the bled out additive is transferred to a pass roll in a film forming process to cause an increase in the friction coefficient between the film and the roll and thus scratches are easily generated.

In a case of producing a film by extruding the melt in multi layers, a preferable thickness of the inner layer of the film to be obtained (a proportion with respect to all layers) is preferably 50% or more and 95% or less, more preferably 60% or more and 90% or less, and even more preferably 70% or more and 85% or less. Such lamination can be carried out by using a feed block die or a multi-manifold die.

(Cast)

The substantially unstretched film (original film) is preferably obtained by extruding the melt extruded from the die on a casting drum and solidifying the melt by cooling according to paragraph [0059] of JP2009-269301A.

The refractive index of the substantially unstretched polyester film in a longitudinal direction is preferably 1.590 or less, more preferably 1.585 or less, and even more preferably 1.580 or less.

The degree of crystallinity of the substantially unstretched polyester film is preferably 5% or less, more preferably 3% or less, and even more preferably 1% or less. The degree of crystallinity of the substantially unstretched polyester film herein mentioned means the degree of crystallinity at the center of the film in a width direction.

When the degree of crystallinity is adjusted, the temperature of the end portion of the casting drum may be lowered or air may be blown onto the casting drum.

The degree of crystallinity can be calculated from the density of the film. That is, the degree of crystallinity (%) can be calculated by the following calculation equation by using the density X (g/cm$^3$) of the film, the density Y=1.335 g/cm$^3$ at a degree of crystallinity of 0%, and the density Z=1.501 g/cm$^3$ at a degree of crystallinity of 100%.

Degree of crystallinity=$\{Z\times(X-Y)\}/\{X\times(Z-Y)\}\times 100$

The measurement of density can be carried out according to JIS K7112.

(Formation of Polymer Layer (Easily Adhesive Layer))

The polymer layer (preferably an easily adhesive layer) may be formed on the substantially unstretched film which has been melt-extruded by applying the layer before or after stretching, which will be described later.

For the polymer layer, functional layers that may be generally provided as a touch panel resin base material may be used, and among these, an easily adhesive layer is preferably formed as the polymer layer. The easily adhesive layer can be applied according to the method described in paragraphs [0062] to [0070] of WO2012/157662A.

A composition for forming the easily adhesive layer (preferably a coating liquid) contains particles, and the easily adhesive layer is preferably formed by controlling the thickness of the easily adhesive layer and the average particle diameter of the particles such that the height of the particles protruding from the surface of the easily adhesive layer is equal to or more than the thickness of the easily adhesive layer.

(Cross-Direction Stretching)

The production method preferably includes a process of carrying out cross-direction stretching on the substantially unstretched film while the film is being gripped by clips using a tenter type stretching apparatus having clips that travel along a pair of rails provided on both sides of the film transport path.

The tenter type stretching apparatus having clips that travel along a pair of rails installed on both sides of the film transport path is not particularly limited. For the pair of rails, typically, a pair of endless rails is used.

The clip has the same meaning as a gripping member.

The method for producing the first transparent base material film is preferably carrying out cross-direction stretching on the substantially unstretched film. The cross-direction stretching is carried out in a direction orthogonal to the film transport direction while transporting the substantially unstretched film in the film transport direction.

By carrying out cross-direction stretching, a large film in-plane retardation Re can be exhibited. In particular, in order to obtain the first transparent base material film satisfying the ranges of the Re and Re/Rth, at least cross-direction stretching is preferably carried out.

In the method for producing the first transparent base material film, the cross-direction stretching ratio in the cross-direction stretching is preferably controlled in a range of 3.3 times or more and 4.8 times or less. The cross-direction stretching ratio is more preferably 3.5 times or more and 4.5 times or less and even more preferably 3.7 times or more and 4.3 times or less. In a case in which the cross-direction stretching ratio is 3.3 times or more, a sufficiently large Re is obtained. A case in which the cross-direction stretching ratio is 4.8 times or less is preferable from the viewpoint of various mechanical properties.

In the method for producing the first transparent base material film, the film surface temperature at the time of the start of stretching in the cross-direction stretching process is preferably kept in a range of 80° C. or higher and 96° C. or lower. The film surface temperature at the time of the start of stretching is more preferably 82° C. or higher and 95° C. or lower and even more preferably 84° C. or higher and 94° C. or lower. In a case in which the film surface temperature at the time of the start of stretching is 80° C. or higher, orientation or orientation crystallization in the stretching stage does not excessively proceed, Rth is hardly increased, and the ratio Re/Rth is likely to be 0.7 or more. Thus, this case is preferable from the viewpoint of various mechanical properties. In a case in which the film surface temperature at the time of the start of stretching is 96° C. or lower, insufficient orientation hardly occurs, spherulites hardly grow, and Re is sufficiently increased. Thus, this case is preferable from the viewpoint of various mechanical properties.

In the method for producing the first transparent base material film, the film surface temperature at the time of the end of stretching in the cross-direction stretching process is preferably kept in a range of 88° C. or higher and 105° C. or lower. The film surface temperature at the time of the end of stretching is more preferably 90° C. or higher and 102° C. or lower and even more preferably 92° C. or higher and 100° C. or lower. In a case in which the film surface temperature at the time of the end of stretching is 88° C. or higher, orientation or orientation crystallization in the stretching stage does not excessively proceed, Rth is hardly increased, and the ratio Re/Rth is likely to be 0.7 or more. Thus, this case is preferable from the viewpoint of various mechanical properties. In a case in which the film surface temperature at the time of the end of stretching is 105° C. or lower, insufficient orientation hardly occurs, spherulites hardly grow, and Re is sufficiently increased. Thus, this case is preferable from the viewpoint of various mechanical properties.

In the method for producing the first transparent base material film, it is preferable to gradually increase the film surface temperature during a period from the start of stretching to the end of stretching. A difference between the film surface temperature at the time of the start of stretching and the film surface temperature at the time of the end of stretching is more preferably 1° C. or greater, more preferably 3° C. or greater, and most preferably 5° C. or greater. In a case in which the film surface temperature is increased during a period from the start of stretching to the end of stretching, spherulites are more hardly formed and orientation does not excessively proceed. Thus, satisfactory Re and Re/Rth and various mechanical properties can be easily obtained.

In the method for producing the first transparent base material film, the film surface temperature at which the stretching ratio is in a range of 1 to 2 times is preferably 80° C. or higher and 92° C. or lower, more preferably 82° C. or higher and 91° C. or lower, and even more preferably 84° C. or higher and 91° C. or lower. In a case in which the film surface temperature at which the stretching ratio is in a range of 1 to 2 times is 80° C. or higher, orientation or orientation crystallization in the stretching stage does not excessively proceed, Rth is hardly increased, and the ratio Re/Rth is 0.7 or more. Thus, this case is preferable from the viewpoint of various mechanical properties. In a case in which the film surface temperature at which the stretching ratio is in a range of 1 to 2 times is 92° C. or lower, insufficient orientation hardly occurs, fine polyester crystals hardly grow, and Re is sufficiently increased. Thus, this case is preferable from the viewpoint of various mechanical properties.

In the method for producing the first transparent base material film, the film surface temperature at which the stretching ratio is in a range of 2 to 3 times in the cross-direction stretching process is preferably 85° C. or higher and 97° C. or lower, more preferably 86° C. or higher and 97° C. or lower, and even more preferably 87° C. or higher and 96° C. or lower. In a case in which the film surface temperature at which the stretching ratio is in a range of 2 to 3 times is 85° C. or higher, orientation or orientation crystallization in the stretching stage does not excessively proceed, Rth is hardly increased, and the ratio Re/Rth is 0.7 or more. Thus, this case is preferable from the viewpoint of various mechanical properties. In a case in which the film surface temperature at which the stretching ratio is in a range of 2 to 3 times is 97° C. or lower, insufficient orientation hardly occurs fine polyester crystals hardly grow, and thus Re is sufficiently increased. Thus, this case is preferable from the viewpoint of various mechanical properties.

In the method for producing the first transparent base material film, the film surface temperature at which the stretching ratio is in a range of 3 times or more in the cross-direction stretching process is preferably 88° C. or higher and 102° C. or lower, more preferably 90° C. or higher and 101° C. or lower, and even more preferably 92° C. or higher and 100° C. or lower. In a case in which film surface temperature at which the stretching ratio is in a range of 3 times or more is 90° C. or higher, orientation or orientation crystallization in the stretching stage does not excessively proceed, Rth is hardly increased, and the Re/Rth ratio is 0.7 or more. Thus, this case is preferable from the viewpoint of various mechanical properties. In a case in which the film surface temperature at which the stretching ratio is in a range of 3 times or more is 102° C. or lower, insufficient orientation hardly occurs, fine polyester crystal hardly grow, and thus Re is sufficiently increased. Thus, this case is preferable from the viewpoint of various mechanical properties.

In the method for producing the first transparent base material film, since the film surface temperature during a period from the start of stretching to the end of stretching is gradually increased, in the cross-direction stretching process, the film surface temperature at which the stretching ratio is in a range of 1 to 2 times, the film surface temperature at which the stretching ratio is 2 to 3 times, and the film surface temperature at which the stretching ratio is in a range of 3 times or more is preferably set to be equal to or lower than film surface temperatures in the ranges at stretching in which the stretching ratio is small, respectively. That is, it is preferable that the film surface temperature at which the stretching ratio is in a range of 2 to 3 times is not equal to or lower than the film surface temperature at which the stretching ratio is in a range of 1 to 2 times, and it is preferable that the film surface temperature at which the stretching ratio is in a range of 3 or more is not equal to or lower than the film surface temperature at which the stretching ratio is in a range of 2 to 3 times.

In preheating, stretching, thermal fixing, thermal relaxation, and cooling of the cross-direction stretching process, as temperature control means for heating or cooling the first transparent base material film, means for blowing warm air or cool air onto the first transparent base material film, bringing the first transparent base material film into contact with the surface of a temperature controllable metal plate, or causing the first transparent base material film to pass the vicinity of a temperature controllable metal plate may be used.

That is, the cross-direction stretching can be achieved by gripping the both ends of the film by the clips and expanding the width between the clips while heating the film.

(Thermal Fixing and Thermal Relaxation)

The method for producing the first transparent base material film preferably includes a thermal fixing process of heating the film after cross-direction stretching to the highest temperature in the tenter.

It is preferable to carry out heat treatment called "thermal fixing" to promote crystallization after stretching. Carrying out the heat treatment at a temperature higher than the stretching temperature promotes crystallization and thus the strength of the film can be improved.

In the thermal fixing, volume shrinkage occurs for crystallization.

For a thermal fixing method, a plurality of slits for blowing hot air onto the stretched portion is provided in parallel with a width direction. The thermal fixing can be achieved by increasing the temperature of a gas blown from these slits to be higher than the temperature of the stretched portion.

In addition, the temperature may be increased by providing a heat source (infrared heater; IR heater, a halogen heater, or the like) in the vicinity of the stretching (stretched portion) outlet.

The highest reachable film surface temperature in the thermal fixing and the thermal relaxation process is preferably 130° C. or higher and 190° C. or lower, more preferably 140° C. or higher and 180° C. or lower, and even more preferably 150° C. or higher and 175° C. or lower. In a case in which the highest reachable film surface temperature in the thermal fixing and the thermal relaxation process is 130° C. or higher, the thermal shrinkage rate can be reduced. Thus, this case is preferable. In a case in which the highest reachable film surface temperature in the thermal fixing and the thermal relaxation process is 190° C. or lower, Rth is hardly increased and the ratio Re/Rth is not excessively reduced. Thus, this case is preferable.

The method for producing the first transparent base material film preferably includes a thermal relaxation process of heating the thermally fixed film and reducing the length of the film at least in the MD direction. In other words, the method for producing the first transparent base material film preferably includes the thermal fixing process of heating the film after cross-direction stretching to the highest temperature in the tenter, and the thermal relaxation process of reducing the distance between the pair of rails while heating the film which has been subjected to the thermal fixing process before the film after cross-direction stretching is released from the clips. The thermal relaxation process is not strictly limited to the embodiment in which the thermal relaxation process is carried out after the thermal fixing process, and the thermal fixing process and the thermal relaxation process may be carried out at the same time. In a case of carrying out the thermal fixing process and the thermal relaxation process at the same time, it is preferable that the thermal fixing process is set to a point of time when the film is heated to the highest temperature in the tenter, and the thermal relaxation process is set to a point of time when the film is continuously subjected to thermal relaxation at a temperature not higher than the highest temperature in the tenter.

The film is preferably relaxed simultaneously with the heat treatment after the thermal fixing process (the film is shrunk) and is more preferably relaxed in at least the TD (transverse direction) or the MD (machine direction).

The cross-direction relaxation can be achieved by reducing the expanded width between the clips.

Such relaxation can be achieved by, for example, reducing the interval of a pantograph by using a pantographic chuck as a tenter, or driving the clips on an electromagnet to reduce the speed thereof.

In the thermal relaxation process, a relaxation rate in the MD direction, which is a rate of reducing the length of the thermally fixed film in the MD direction, is preferably 1% to 7%, more preferably 2% to 6%, and even more preferably 3% to 5% from viewpoint of suppressing the generation of scratches in the first transparent base material film. In a case in which the relaxation rate in the MD direction is 1% or more, the thermal shrinkage rate in the MD direction can be reduced and wrinkles are hardly generated. In a case in which the relaxation rate in the MD direction is 7% or less, the slack in the MD direction hardly occurs during the relaxation treatment and surface failure is hardly generated. Thus, this case is preferable.

The relaxation rate in the TD direction, which is a rate of reducing the length of the thermally fixed film in the TD direction, is preferably 0% to 6%, more preferably 1% to 4%, and even more preferably 1% to 3% from the viewpoint of suppressing the generation of scratches in the first transparent base material film. In a case in which the relaxation rate in the TD direction is 6% or less, the slack in the TD direction hardly occurs during the relaxation treatment and surface failure is hardly generated. Thus, this case is preferable.

The temperature of relaxation in the TD direction (transverse direction) is preferably in the range of the thermal fixing temperature, and as long as thermal fixing of heating the film after cross-direction stretching to the highest temperature in the tenter can be carried out, the temperature of relaxation may be the same as the temperature of the thermal fixing (that is, the temperature of relaxation may reach the highest temperature in the tenter) or may be lower than the temperature of the thermal fixing.

By carrying out the stretching and the thermal fixing, satisfactory Re, Rth, and Re/Rth of the first transparent base material film can be easily obtained. That is, by carrying out stretching and thermal fixing according to these methods, the first transparent base material film which exhibits the effect of reducing rainbow unevenness can be easily formed.

(Cooling)

The method for producing the first transparent base material film preferably includes a process of cooling the film after thermal fixing before the film after thermal fixing is released from the clips. The film after stretching (preferably after thermal fixing) is more preferably cooled before the film is released from the clips from the viewpoint of easily lowering the temperature of the clips when the film after cross-direction stretching is released from the clips.

The cooling temperature of the film after thermal fixing is preferably 80° C. or lower, more preferably 70° C. or lower, and particularly preferably 60° C. or lower.

As a method for cooling the film after thermal fixing, specifically, a method including applying cool air onto the film can be used.

(Release of Film from Clips)

In the method for producing the first transparent base material film, it is preferable that the film after cross-direction stretching is released from the clips.

The temperature of the surface of the film in a case in which the film is detached from the gripping members is preferably controlled in a range of 40° C. to 140° C. The temperature of the surface of the film in a case in which the film is detached from the gripping members is more preferably 50° C. or higher and 120° C. or lower and even more preferably 60° C. or higher and 100° C. or lower.

A preferable range of the thickness of the first transparent base material film after the film formation is completed (after the cross-direction stretching and the process of releasing the film from the clips) is the same as the preferable range of the thickness of the first transparent base material film.

(Collection, Slitting, and Winding of Film)

After the cross-direction stretching and the process of releasing the film from the clips are completed, the film is trimmed, slit, and thickened as required, and then is wound for collection.

In the method for producing the first transparent base material film, the film width after the film is released from the clips is preferably 0.8 to 6 m is preferably 1 to 5 m, and particularly preferably 1 to 4 m from the viewpoint of effectively securing the film product width and suppressing an excessive increase in apparatus size. Although an optical film which requires accuracy is typically formed to have a width of less than 3 m, it is preferable to form a film having the above wide width in the present invention.

In addition, the film formed to have the above wide width may be slit and then wound. The number of slits of the film formed to have the above wide width is preferably 2 or more and 6 or less, more preferably 2 or more and 5 or less, and even more preferably 3 or more and 4 or less.

After the film is slit, both ends of the film are preferably thickened (subjected to knurling).

The film is preferably wound around a winding core having a diameter of 70 mm or more and 600 mm or less to have a thickness of 1,000 m or more and 10,000 m or less. In addition, the thickness of the wound film is the same as paragraph [0049] of JP4962661B.

Further, a masking film is preferably attached to the film before the film is wound.

<Properties of Second Transparent Base Material Film>

(Phase Difference)

In the transparent base material film laminate of the present invention, the film in-plane retardation Re of the second transparent base material film is preferably more than 0 nm, and is preferably smaller than the film in-plane retardation Re of the first transparent base material film.

In a case in which the Re of the second transparent base material film is 200 nm or more, the Re of the second transparent base material film is preferably 0.5 times or less the Re of the first transparent base material film, and in a case in which the Re of the second transparent base material film is 400 nm or more, the Re of the second transparent base material film is more preferably 0.35 times or less the Re of the first transparent base material film. In a case in which the Re of the second transparent base material film is 500 nm or more, the Re of the second transparent base material film is even more preferably 0.25 times or less the Re of the first transparent base material film. As the Re of the second transparent base material film becomes smaller than the Re of the first transparent base material film and further becomes equal to or less than each upper limit described above, although the details of the mechanism is not clear, the second step of depolarization is easily carried out and thus rainbow unevenness hardly occurs. A case in which the Re of the second transparent base material film is greater than 0 nm is preferable from the viewpoint of easily causing the second step of depolarization and easily producing the second transparent base material film. In order to form a film having a Re of 0 nm, expensive resin and exact stretching accuracy are required. As the Re becomes greater than 0 nm and further becomes equal to or greater than each lower limit described above, the second step of depolarization easily occurs and in a case in which the second transparent base material film is produced by biaxial stretching or the like, the second transparent base material film can be produced without very exactly controlling the stretching accuracy.

In the transparent base material film laminate of the present invention, the retardation Rth of the second transparent base material film in the film thickness direction is preferably 20,000 nm or less. The Rth of the second transparent base material film is preferably 12,000 nm or less and more preferably 8,000 nm or less. In a case in which the Rth is 20,000 nm or less, the second step of depolarization is easily carried out and rainbow unevenness hardly occurs.

The ratio Re/Rth of the film in-plane retardation Re of the second transparent base material film with respect to the retardation Rth of the second transparent base material film in the film thickness direction is preferably 0.01 to 0.40, more preferably 0.03 to 0.35, and particularly preferably 0.05 to 0.30.

The Re and Rth can be adjusted according to the kind of the resin to be used for the film, the amounts of the resin and additives, the addition of a retardation increasing agent, the thickness of the film, the stretching direction and stretching ratio of the film, and the like.

A method for controlling the Re and Rth of the second transparent base material film to be in the above range is not particularly limited and for example, the Re and Rth can be controlled by a stretching method.

(Thickness)

In the transparent base material film laminate of the present invention the thickness of the second transparent base material film is preferably 80 μm or less and is preferably set to be smaller than the thickness of the first transparent base material film. The thickness of the second transparent base material film is preferably 60 μm or less and more preferably 50 μm or less. In a case in which the thickness of the second transparent base material film is 80 μm or less or in a case in which the thickness of the second transparent base material film is smaller than the thickness of the first transparent base material film, the optical properties are easily obtained and rainbow unevenness is easily suppressed.

(Refractive Index and Degree of Crystallization)

In the transparent base material film laminate of the present invention, the second transparent base material film is preferably a biaxially oriented polyester film. The second transparent base material film is used as a conductive film (preferably as a transparent conductive film) in many cases and is preferably a biaxially oriented polyester film from the viewpoint of maintaining various mechanical properties such as heat resistance resistant to high temperature treatment and strength in a case of providing a conductive layer.

Whether the second transparent base material film is a biaxially oriented polyester film can be confirmed from the refractive index and the degree of crystallinity of the film of the film. Specifically, it is preferable that both the refractive indices of the second transparent base material film in the longitudinal direction and the width direction are more than 1.610 or less, and the degree of crystallinity is more than 10%.

A preferable range of the refractive indices of the second transparent base material film in the longitudinal direction and the width direction is preferably 1.620 or more, more preferably 1.630 or more, and even more preferably 1.640 or more.

A difference between the larger refractive index of the refractive indices of the second transparent base material film in the longitudinal direction and the width direction and the smaller refractive index of the refractive indices in the longitudinal direction and the width direction is preferably 0.001 or more and 0.049 or less, more preferably 0.002 or more and 0.045 or less, even more preferably 0.003 or more and 0.040 or less, and most preferably 0.005 or more and 0.030 or less.

The degree of crystallinity of the second transparent base material film is preferably 10% or more, more preferably 20% or more, and even more preferably 30% or more.

<Material of Second Transparent Base Material Film>

In a case in which the second transparent base material film is a single layer, a preferable range of the material of the second transparent base material film is the same as the preferable range of the material of the first transparent base material film.

In a case in which the second transparent base material film is a laminate, it is preferable that the second transparent base material film is a conductive film in which a conductive layer is formed in the transparent base material film laminate of the present invention.

The conductive film is preferably a conductive film in which a conductive layer is formed on an arbitrary support, more preferably a conductive film in which a conductive layer is formed on a polyester film, and particularly preferably a conductive film in which a conductive layer is formed on the biaxially oriented polyester film. In this case, a preferable range of the material of the polyester film is the same as the preferable range of the material of the first transparent base material film.

(Material of Conductive Layer)

The material of the conductive layer is not particularly limited and examples thereof include indium tin oxide (ITO), tin oxide, antimony tin oxide (ATO), copper, silver, aluminum, nickel, chromium, and alloys thereof.

The conductive layer preferably has an electrode pattern. In addition, the conductive layer preferably has a transparent electrode pattern. The electrode pattern may be formed by patterning a layer of a transparent conductive material or may be formed by patterning a layer of an opaque conductive material.

For example, as the transparent conductive material, oxides such as ITO and ATO, silver nanowires, carbon nanotubes, conductive polymers and the like can be used.

Examples of the layer of an opaque conductive material include a metal layer. Any metal layer can be used as long as the metal layer is formed of a metal having conductivity, and silver, copper, gold, aluminum, and the like are suitably used. The metal layer may be a layer of a metal element or an alloy, and metal particles may be bonded by a bonding material. Alternatively, blackening treatment or rustproofing treatment is applied to as required, to the metal surface. In a case of using a metal, a substantially transparent sensor portion and a peripheral wiring portion can be collectively formed.

In the transparent base material film laminate of the present invention, the conductive layer preferably includes a plurality of fine metal wires.

In the transparent base material film laminate of the present invention, the fine metal wire is preferably formed of silver or an alloy including silver. The conductive layer in which fine metal wire is formed of silver or an alloy including silver is not particularly limited and known conductive layers can be used. For example, conductive layers described in paragraphs [0040] and [0041] of JP2014-

168886A are preferably used and the contents of this publication are incorporated in the specification.

In the transparent base material film laminate of the present invention, the fine metal wire is preferably formed of copper or an alloy including copper. The conductive layer in which the fine metal wire is formed of copper or an alloy including copper is not particularly limited and known conductive layers can be used. For example, conductive layers described in paragraphs [0038] to [0059] of JP2015-49852A are preferably used and the contents of this publication are incorporated in the specification.

In the transparent base material film laminate of the present invention, the conductive layer is preferably formed of oxide. In a case in which the conductive layer is formed of oxide, in the transparent base material film laminate of the present invention, the oxide is more preferably indium oxide containing tin oxide or tin oxide containing antimony. The conductive layer formed of oxide is not particularly limited and known conductive layers can be used. For example, conductive layers described in paragraphs [0017] to [0037] of JP2010-27293A are preferably used and the contents of the publication are incorporated in the specification.

Among the conductive layers having these configurations, the transparent base material film laminate of the present invention preferably has the conductive layer including the plurality of fine metal wires which is arranged in a mesh shape or in a random state, and more preferably has the conductive layer in which the fine metal wires are arranged in a mesh shape. Among these, the conductive layer in which the fine metal wires are arranged in a mesh shape and the fine metal wire is formed of silver or an alloy including silver is particularly preferable.

<Method for Producing Second Transparent Base Material Film>

A method for producing the second transparent base material film is not particularly limited and known methods can be employed. Among these, the method for producing the second transparent base material film is preferably a method for producing a biaxially oriented film, and both machine-direction stretching in the MD direction and cross-direction stretching in the TD direction are preferably carried out.

A preferable embodiment of the method for producing the second transparent base material film is the same embodiment as the preferable embodiment of the method for producing the first transparent base material film except for the stretching process and formation of a conductive layer, which will be described later.

In addition, in a case of forming a conductive layer, instead of forming the easily adhesive layer in the method for producing the first transparent base material film, other functional layers such as an undercoat layer and an antistatic layer described in paragraph [0055] of JP2014-168886A may be provided. The contents of this publication are incorporated in the specification.

Hereinafter, a preferable embodiment of the method for producing the second transparent base material film will be described.

(Stretching Process)

The method for producing the second transparent base material film is preferably carrying out both machine-direction stretching in the MD direction and cross-direction stretching in the TD direction on an unstretched film.

As preferable embodiments of the machine-direction stretching and the cross-direction stretching in the method for producing the second transparent base material film, methods described in paragraphs [0128] to [0180] of JP2014-189002A can be used. The contents of this publication are incorporated in the specification.

Satisfactory Re, Rth, and Re/Rth of the second transparent base material film can be obtained by stretching and thermal fixing.

(Formation of Conductive Layer)

A method of forming a conductive layer is not particularly limited and known methods can be used. For example, methods described in paragraphs [0040] to [0086] of JP2014-168886A are preferably used and the contents of this publication are incorporated in the specification.

As a common method for forming a conductive layer, there are a physical vapor deposition (PVD) method such as a sputtering method, a vacuum deposition method, or an ion plating method, or a chemical vapor deposition (CVD) method, a coating method, a print method, and the like. In addition, an undercoat layer may be provided to improve the transparency and optical properties of the conductive layer before the conductive layer is formed. Further, in order to improve adhesiveness, a metal layer formed of a single metal element or an alloy of two or more metal elements may be provided between the undercoat layer and the support of the second transparent base material film (preferably a biaxially oriented polyester film). For the metal layer, a metal selected from the group consisting of silicon, titanium, tin, and zinc is desirably used.

As a method of forming a pattern in a case in which the conductive layer is a conductive pattern, photolithography (etching), pattern printing, transferring, self-organization and the like can be applied. Examples of the conductive pattern layer using etching include a layer formed by laminating a copper foil on the second transparent base material film with an adhesive, a layer formed by vacuum deposition of copper, and a layer formed by etching a layer formed by sputtering a metal or oxide such as ITO on the second transparent base material film to have a predetermined pattern. Examples of a method for forming a conductive pattern layer by pattern printing include a method including printing a predetermined pattern with a conductive ink; a method including printing a predetermined pattern using a material having a catalytic function for electroless plating, and carrying out electroless plating on a conductive metal; and a method including carrying out printing using a material for forming an adduct with a catalyst for electroless plating, and then carrying out electroless plating treatment by adding a catalyst. Examples of the conductive ink include silver paste, copper paste, and conductive polymers. Examples of the material having a catalytic function include inks containing catalyst particles of palladium or the like or particles supporting catalyst particles on the surface thereof. Examples of the material for forming an adduct with a catalyst include inks containing silver, conductive polymer, or the like. Examples of the metal for forming an electroless plating layer include conductive metals such as copper, nickel, and silver.

An arbitrary method can be applied according to the pattern accuracy required for the method for pattern printing. As the method for pattern printing, screen printing, intaglio offset printing, or a method including transferring a pattern from a recessed plate by an ultraviolet (UV) curable primer is suitably used.

[Touch Panel Sensor Film]

A touch panel sensor film of the present invention includes the transparent base material film laminate of the present invention.

In the touch panel sensor film, a hard coat layer and a conductive layer are preferably laminated on the second transparent base material film of the transparent base material film laminate the present invention. The touch panel sensor film preferably has the conductive layers 4 on both surfaces of the second transparent base material film 2 as shown in FIG. 1.

[Touch Panel]

A touch panel of the present invention includes the transparent base material film laminate of the present invention. The transparent base material film laminate of the present invention can be used in the touch panel.

A liquid crystal panel and a polarizing plate to be arranged on an emission surface of the liquid crystal panel are not particularly limited and known liquid crystal panels and polarizing plates can be used.

The touch panel of the present invention is not particularly limited and can be appropriately selected according to the purposes. Examples thereof include a surface type electrostatic capacitive touch panel, projection type electrostatic capacitive touch panel, and a resistance film type touch panel. The touch panel includes a so-called touch sensor and a so-called touch pad. The layer structure of a touch panel sensor electrode portion in the touch panel may be any one of a sticking method of sticking two sheets of the transparent electrodes, a method of providing transparent electrodes on both surfaces of one sheet of the substrate, a single-sided jumper method, a through-hole method, or a single-sided laminating method. In addition, the projection type electrostatic capacitive touch panel is preferably driven by an alternating current (AC) than by a direct current (DC), and a driving method with short voltage application time to the electrode is more preferable.

[Image Display Device]

An image display device of the present invention includes the transparent base material film laminate of the present invention.

An LCD, which is a representative example of the image display device, preferably includes a transmissive display and a backlight light source for irradiating the transmissive display with light from the rear surface.

The backlight light source of the image display device is irradiated with light from the side of the polarizing plate opposite to the viewing side. A phase difference film and a polarizing plate protective film may be inserted between the backlight light source and the polarizing plate on the viewing side (not shown in FIG. 1). A layer of an adhesive or a pressure sensitive adhesive may be provided between each layer of the image display device.

The image display device may be a plasma display panel (PDP). The PDP preferably includes a front glass substrate with an electrode on the surface thereof, and a rear glass substrate with an electrode and a small groove on the surface thereof, the groove having red, green, and blue fluorescent layers therein, facing the front glass substrate, with discharge gas enclosed between the substrates.

The image display device may be an image display device such as an electroluminescent display (ELD) configured to perform display by controlling the voltage applied to the glass substrate where zinc sulfide or a diamine substance which emits light under application of voltage, for example, a light emitting material, is vapor-deposited, or a cathode ray tube (CRT) configured to convert electric signals into light and produce images that are visible to human eyes. In this case, each of the above display devices has the above optical layered body, on its outermost surface or on the surface of the front plate.

In the image display device, the backlight light source is not particularly limited and is preferably a white light emitting diode (white LED). The image display device is preferably a liquid crystal display device of a vertical alignment (VA) mode or in-plane switching (IPS) mode including a white light emitting diode as the backlight light source.

The white LED is an element which emits white light by combining a light emitting diode that emits blue light or ultraviolet light using a fluorescence system, that is, a compound semiconductor, with a phosphor. Among these, since the white light emitting diode formed of a light emitting element formed by combining a blue light emitting diode using a compound semiconductor with a yttrium aluminum garnet-based yellow phosphor has a continuous and wide range of light emitting spectrum, the white light emitting diode is effective in improving antireflection performance and bright point contrast and is also excellent in light emitting efficiency. Thus, the white light emitting diode is suitable for the backlight light source in the present invention. In addition, since the white LED with small electric consumption can be widely used, the effect of energy saving can be also exhibited.

In addition, the VA mode is an operation mode in which the liquid crystal molecules are oriented vertically to the substrate of the liquid crystal cell under no application of voltage so as to show dark display and the liquid crystal molecules fall down under application of voltage so as to show bright display.

In addition, the IPS mode is a system for performing display by rotating liquid crystals in a substrate surface by a horizontal field applied to a pair of comb-shaped electrodes provided on one substrate of the liquid crystal cell.

Any image display device of the present invention can be used for displays of a television, computer, electronic paper, touch panel, tablet personal computer (PC), and the like. Particularly, the image display device can be used suitably for the surfaces of displays for high definition images such as a cathode-ray tube display device (CRT), a liquid crystal display (LCD), a plasma display (PDP), an electroluminescent display (ELD), a field emission display (FED), electronic paper, a touch panel, a tablet personal PC, and the like.

A liquid crystal display device of a VA mode or IPS mode including a white light emitting diode as the backlight light source is preferable.

[Method for Improving Visibility of Image Display Device]

A method for improving visibility of an image display device of the present invention is a method for improving visibility of an image display device having at least a backlight light source and a polarizing plate arranged on the viewing side of the backlight light source, including arranging the transparent base material film laminate of the present invention on the viewing side of the polarizing plate, in which the transparent base material film laminate has at least a first transparent base material film and a second transparent base material film, a film in-plane retardation Re of the first transparent base material film is 4,000 nm or more, the transparent base material film laminate is arranged for use such that an angle formed between a slow axis of the first transparent base material film and an absorption axis of the polarizing plate is 45°±20°, and such that an angle formed between a slow axis of the second transparent base material film and an absorption axis of the polarizing plate is 90°±30° or 0°±30°, an angle formed between the slow axis of the first transparent base material film and the slow axis of the second transparent base material film is neither 0° nor 90°, and the second transparent base material film is arranged on a viewing side with respect to the first transparent base material film.

By adopting this configuration, it is possible to provide a method for improving the visibility of an image display device capable of suppressing production loss, suppressing the occurrence of rainbow unevenness, and suppressing the occurrence of blackout. The image display device of the present invention is able to suppress production loss, suppress the occurrence of rainbow unevenness, and suppress the occurrence of blackout. Such a method for improving visibility by using the image display device of the present invention is also one of the present inventions.

EXAMPLES

The present invention further specifically described with Examples and Comparative Examples below. Materials shown in the following examples, amounts, ratios, treatment contents, treatment procedures and the like, can be appropriately changed without departing from the scope of the present invention. Accordingly, the scope of the present invention should not be limitatively interpreted by the Examples mentioned below.

Unless otherwise specified, "parts" are by mass.

Example 1

<Synthesis of Raw Material Polyester>
(Raw Material Polyester 1)

As described below, a raw material polyester 1 (Sb catalyst-based PET) was obtained by a continuous polymerization apparatus using a direct esterification method including directly reacting terephthalic acid and ethylene glycol with each other, distilling water off, carrying out esterification, and then carrying out polycondensation under reduced pressure.

(1) Esterification Reaction

In a first esterification reaction tank, 4.7 tons of high purity terephthalic acid and 1.8 tons of ethylene glycol were mixed for 90 minutes to form slurry, and the slurry was continuously supplied to the first esterification reaction tank at a flow rate of 3,800 kg/h. Further, an ethylene glycol solution of antimony trioxide was continuously supplied, and a reaction was conducted at a temperature inside the reaction tank of 250° C. for an average retention time of approximately 4.3 hours under stirring. At this time, the antimony trioxide was continuously added such that the amount of Sb added was 150 ppm in terms of an element.

This reaction product was transferred to a second esterification reaction tank, and the reaction product was allowed to react under stirring at a temperature inside the reaction tank of 250° C. for an average retention time of 1.2 hours. To the second esterification reaction tank, an ethylene glycol solution of magnesium acetate and an ethylene glycol solution of trimethyl phosphate were continuously supplied such that the amount of Mg added and the amount of P added were respectively 65 ppm and 35 ppm in terms of an element.

(2) Polycondensation Reaction

The esterification reaction product obtained as described above was continuously supplied to a first polycondensation reaction tank, and polycondensation was carried out under stirring at a reaction temperature of 270° C. and a pressure inside the reaction tank of 20 torr ($2.67 \times 10^{-3}$ MPa) for an average retention time of about 1.8 hours.

Further, the reaction product was transferred to a second polycondensation reaction tank, and in this reaction tank, a reaction (polycondensation) was conducted under stirring under the conditions of a temperature inside the react m tank of 276° C. and a pressure inside the reaction tank of 5 torr ($6.67 \times 10^{-4}$ MPa) for an average retention time of about 1.2 hours.

Subsequently, the reaction product was further transferred to a third polycondensation reaction tank, and in this reaction tank, a reaction (polycondensation) was conducted under conditions of a temperature inside the reaction tank of 278° C. and a pressure inside the reaction tank of 1.5 ton ($2.0 \times 10^{-4}$ MPa) for an average retention time of 1.5 hours, whereby a reaction product (polyethylene terephthalate (PET)) was obtained.

Next, the obtained reaction product was ejected in cold water into a strand shape, and the strands were immediately cut to prepare pellets of a polyester <cross section: major axis of about 4 mm and minor axis of about 2 mm, and length: about 3 mm>.

The intrinsic viscosity IV of the obtained polymer was 0.63 (hereinafter, abbreviated as PET 1). This polymer was used as the raw material polyester 1.

<Production of First Transparent Base Material Film>
—Film Forming Process—

The raw material polyester 1 (PET 1) was dried to have a moisture content of 20 ppm or less. Then, the dried polyester was fed to into Hopper 1 of a single screw kneading extruder with a diameter of 50 mm. The raw material polyester 1 was melted in the extruder at 300° C. and the molten resin was extruded from the die under the following extrusion conditions through a gear pump and a filter (having a pore diameter of 20 μm).

The molten resin was extruded from the die under the molten resin extrusion conditions of a pressure change of 1% and a temperature distribution of 2% in the molten resin. Specifically, for the back pressure, pressure was applied by pressure 1% higher than the average pressure inside the barrel of the extruder, and for the piping temperature of the extruder, heating was performed at a temperature by 2% higher than the average temperature inside the barrel of the extruder.

The molten resin extruded from the die was extruded onto a cooling cast drum whose temperature was set to 25° C. and was caused to closely adhere to the cooling cast drum by using a static electricity applying method. The unstretched polyester film 1 was obtained by peeling off the molten resin by using a peeling roll arranged opposite to the cooling cast drum.

The intrinsic viscosity IV of the unstretched polyester film 1 obtained was 0.62, the refractive index in the longitudinal direction was 1.573, and the degree of crystallization was 0.2%.

The unstretched polyester film 1 was dissolved in a mixed solvent of 1,1,2,2-tetrachloroethane/phenol (=⅔ [mass ratio]) and the intrinsic viscosity IV was obtained from the solution viscosity at 25° C. in the mixed solvent.

The refractive index of the unstretched polyester film was measured in the following manner.

The orientation axis directions of the unstretched polyester film were obtained by using two polarizing plates, and the film was cut to a rectangular shape having a size of 4 cm×2 cm so that the orientation axis directions were orthogonal to each other, thereby preparing a measurement sample. For this sample, the refractive indexes (nx and ny) of the two orthogonal axes and the refractive index (nz) in the thickness direction were obtained by using an Abbe refractometer (NAR-4T, manufactured by Atago Co., Ltd., a measurement wavelength of 589 nm).

The degree of crystallization of the unstretched polyester film was measured in the following manner.

The degree of crystallinity can be calculated from the density of the film. That is, the degree of crystallinity (%) can be calculated by the following calculation equation by using the density X (g/cm$^3$) of the film, the density Y=1.335 g/cm$^3$ at a degree of crystallinity of 0%, and the density Z=1.501 g/cm$^3$ at a degree of crystallinity of 100%.

Degree of crystallinity=$\{Z\times(X-Y)\}/\{X\times(Z-Y)\}\times 100$

The measurement of density was carried out according to Japanese Industrial Standards (JIS) K7112.

—Formation of Easily Adhesive Layer—

The following compounds were mixed at the following ratio to prepare a coating liquid H1 for an easily adhesive layer.

Coating Liquid H1 for Easily Adhesive Layer

| | |
|---|---|
| Polyester resin: (IC) | 60 parts by mass |
| Acrylic resin: (II) | 25 parts by mass |
| Melamine compound: (VIB) | 10 parts by mass |
| Particles: (VII) | 5 parts by mass |

The details of compounds used will be described below.

Polyester Resin: (IC)

Sulfonic acid-based aqueous dispersion of polyester resin obtained by copolymerization of monomers of the following composition Monomer composition: (acid component) terephthalic acid/isophthalic acid/5-sodium sulfoisophthalic acid//(diol component) ethylene glycol/1,4-butanediol/diethylene glycol=56/40/4//70/20/10 (mol %)

Acrylic resin: (II)

Aqueous dispersion of acrylic resin obtained by polymerization of monomers of the following composition Emulsified polymer of ethyl acrylate/n-butyl acrylate/methyl methacrylate/N-methylol acrylamide/acrylic acid=65/21/10/2/2 (% by mass) (emulsifier: anionic surfactant)

Urethane resin: (IIIB)

Aqueous dispersion of urethane resin obtained by neutralizing a prepolymer constituted of 400 parts by mass of polycarbonate polyol constituted of 1,6-hexanediol and diethyl carbonate and having a number average molecular weight of 2,000, 10.4 parts by mass of neopentylglycol, 58.4 parts by mass of isophorone diisocyanate, and 74.3 parts by mass of dimethylolbutanoic acid with triethylamine and extending the chain length with isophoronediamine Melamine compound: (VIB) Hexamethoxymetyl melamine Particles: (VII) Silica sol having an average particle diameter of 150 nm (the average particle diameter means an average primary particle diameter, that is, an average value of primary particle diameters)

—Application of Easily Adhesive Layer to Both Surfaces of Polyester Film—

By a bar coating method using a wire bar, the coating liquid H1 for an easily adhesive layer was applied to one side of the unstretched polyester film 1 using the wire bar while the amount of the coating liquid was adjusted to form a coating layer having a thickness of 50 nm after stretching.

—Cross-Direction Stretching Process—

The unstretched polyester film 1 was led to a tenter (cross-direction stretching machine), and while gripping the end portion of the film with a clip, was subjected to cross-direction stretching under the following conditions by the following method.

—Preheating Portion—

Heating was carried out with hot air such that the film surface temperature at the time of the start of stretching reached 89° C.

The film surface temperature at the time of the start of stretching was measured at the center position of the in the film width direction by using a radiation thermometer (model number: RT61-2, manufactured by Hayashi Denko, used at an emissivity of 0.95) when the stretching was started.

—Stretching Portion—

Unstretched polyester film 1 preheated was subjected to cross-direction stretching in the width direction using a tenter under the following conditions while heating the film with hot air.

The film surface temperature at each stretching ratio was measured at the center position in the film width direction at each stretching ratio by using a radiation thermometer (model number: RT61-2, manufactured by Hayashi Denko, used at an emissivity of 0.95).

<Conditions>

Cross-direction stretching ratio: 4.1 times

Film surface temperature at a stretch ratio of 2 times: 90° C.

Film surface temperature at a stretch ratio of 3 times: 94° C.

Film surface temperature at the time of the end of stretching: 95° C.

—Thermal Fixing Portion and Thermal Relaxation Portion—

Next, hot air was blown out onto the film from a hot air blowing nozzle from the vertical direction with respect to the film, and while controlling the film surface temperature of the polyester film to be in the following range, thermal fixing and thermal relaxation treatment were carried out.

<Conditions>

Highest reachable film surface temperature (thermal fixing temperature): 168° C.

Thermal relaxation rate: MD direction 4%, TD direction 1.5%

—Cooling Portion—

Next, cooling was carried out by blowing out cool air onto the film from a cool air blowing nozzle from the vertical direction with respect to the film. The cooling was carried out such that the film surface temperature when the film was released from the clip of the tenter reached 40° C.

The film surface temperature was measured at the center position in the film width direction by using a radiation thermometer (model number: RT61-2, manufactured by Hayashi Denko, used at an emissivity of 0.95).

—Collection of Film—

After the film was cooled and released from the clip, the both ends of the polyester film were trimmed by 20 cm. The film width after trimming was 2 m. Thereafter, the both ends were subjected to extrusion processing (knurling) with a width of 10 mm and then the film having a length of 4,000 m was wound in a roll form at a tension of 18 kg/m.

In this manner, a uniaxially oriented polyester (uniaxially oriented PET) film, which was wound in a roll form and was to be used as the first transparent base material film having a thickness shown in Table 1, was produced. The smaller refractive index of the refractive indices of the uniaxially oriented PET film in the longitudinal direction and the width direction was 1.610 or less, the larger refractive index of the refractive indices in the longitudinal direction and the width direction was 1.670 or more, and the degree of crystallization was 30% or more. It was found that the film was uniaxially oriented from these values.

<Production of Second Transparent Base Material Film>

(Production of Biaxially Oriented PET Film)

A biaxially oriented polyester (biaxially oriented PET) film used as a support of a second transparent base material film in which a support and a conductive layer were laminated was produced in the same manner as in the method for producing the uniaxially oriented polyester film to be used as the first transparent base material film except that the easily adhesive layer was not formed and machine-direction stretching and cross-direction stretching were carried out in the following manner instead of the cross-direction stretching process. Both refractive indices in the longitudinal direction and the width direction of the biaxially oriented PET film were more than 1.610 and the degree of crystallization was 30% or more. It was found that the film was biaxially oriented from these values.

The details of the machine-direction stretching and cross-direction stretching in the production of the biaxially oriented PET film will be described below.

—Machine-Direction Stretching Process—

The unstretched polyester film was allowed to pass between two pairs of nip rolls running at a different circumferential speed and stretched in the machine direction (transport direction).

Preheating temperature: 80° C.
Machine-direction stretching temperature: 90° C.
Machine-direction stretching ratio: 3.5 times
Machine-direction stretching stress: 12 MPa —Cross-Direction Stretching Process—

The polyester film which had been stretched in the machine direction (machine-direction stretched polyester film) was stretched by using the tenter (biaxial stretching machine) having the structure shown in FIG. 3 under the following conditions by the following method.

—Preheating Portion—

The preheating temperature was set to 110° C. and the polyester film was heated so as to be stretchable.

—Stretching Portion—

The preheated machine-direction stretched polyester film was subjected to cross-direction stretching by applying tension onto the film in the film width direction (TD direction) orthogonal to the direction of machine-direction stretching (longitudinal direction) under the following conditions.

<Conditions>

Stretching temperature (cross-direction stretching temperature): 125° C.
Stretching ratio (cross-direction stretching ratio): 4.2 times
Stretching stress (cross-direction stretching stress): 18 MPa —Thermal Fixing Portion—

Next, the highest reachable film surface temperature (thermal fixing temperature) of the polyester film was controlled to be in the following range while heating the film, and thus the film was crystallized.

Highest reachable film surface temperature (thermal fixing temperature $T_{thermal\ fixing}$): 220° C.

Here, the thermal fixing temperature $T_{thermal\ fixing}$ is the pre-peak temperature [° C.] of differential scanning calorimetry (DSC).

—Thermal Relaxation Portion—

The polyester film after thermal fixing was heated to the following temperature and the tension of the film was released.

Thermal relaxation temperature ($T_{thermal\ relaxation}$): 150° C.
Thermal relaxation rate: TD direction (TD thermal relaxation rate)=5%
MD direction (MD thermal relaxation rate)=5%

—Cooling Portion—

Next, the thermally relaxed polyester film was cooled to a cooling temperature of 65° C.

—Collection of Film—

After the cooling was completed, the both ends of the polyester film were trimmed by 20 cm. The width of the film after trimming was 1.3 m. Thereafter, the both ends were subjected to extrusion processing (knurling) with a width of 10 mm and then the film having a length of 8,000 m was wound in a roll form at a tension of 25 kg/m.

In this manner, a biaxially oriented PET film, which was wound in a roll form and was to be used as the second transparent base material film having the thickness shown in Table 2, was prepared.

(Application of Undercoat Layer)

One surface of the biaxially oriented PET film formed as described above was subjected to corona treatment and then a first undercoat layer and a second undercoat layer were applied. The composition and the application method of the first undercoat layer and the second undercoat layer were as described in paragraphs [0117] to [0120] of JP2010-256908A.

(Formation of Conductive Layer Including Water-Soluble Resin and Silver)

The following silver halide photosensitive material was applied to the undercoat layer to prepare a transparent conductive film.

—Silver Halide Photosensitive Material—

An emulsion was prepared which contained 10.0 g of gelatin with respect to 150 g of Ag in an aqueous medium and contained silver iodobromochloride particles (I=0.2 mol % and Br=40 mol %) with an average equivalent spherical diameter of 0.1 μm. In addition, $K_3Rh_2Br_9$ and $K_2IrCl_6$ were added into the emulsion so that the concentration became $10^{-7}$ (mole/mole silver), thereby doping the silver bromide particles with a Rh ion and an Ir ion. Into the emulsion, $Na_2PdCl_4$ was added, and the resultant emulsion was further subjected to gold sulfur sensitization with the use of chloroauric acid and sodium thiosulfate, and then was applied onto the undercoat layer of the second transparent base material film together with a gelatin hardener so that the amount of coating of silver was 10 g/m². At this time, the volume ratio of Ag/gelatin was controlled to be 2:1.

The emulsion was applied onto the film with a width of 1.3 m at 2,000 m and both ends of the film were cut off so as to leave 1.2 m of a center portion. Thus, a silver halide photosensitive material with a rolled form was obtained.

(Exposure)

The pattern of exposure was formed according to a conductive pattern shown in FIG. 1 of JP4820451B. An arrangement pitch Ps of small lattices (reference numeral 18 of FIG. 1 of JP4820451B) was set to 200 μm, and an arrangement pitch Pm of middle lattices (reference numerals 20a to 20h of FIG. 1 of JP4820451B) was set to 2×Ps. The thickness of the conductive layer of the small lattices (reference numeral 18 of FIG. 1 of JP4820451B) was set to 2 μm and the width thereof was set to 10 μm. The exposure was carried out by using parallel light with the high pressure mercury lamp as a light source via a photomask having the pattern above.

Even in a case in which the conductive pattern was formed according to FIG. 5 of JP4820451B, the same evaluation results as in the case of FIG. 1 of JP4820451B were able to be obtained.

(Development Treatment)

The prescription of 1 L of a developer of was as follows.

| | |
|---|---|
| Hydroquinone | 20 g |
| Sodium sulfite | 50 g |
| Potassium carbonate | 40 g |
| Ethylenediamine tetraacetic acid | 2 g |
| Potassium bromide | 3 g |
| Polyethylene glycol 2000 | 1 g |
| Potassium hydroxide | 4 g |
| The pH (power of hydrogen) was adjusted to 10.3. | |

The prescription of 1 L of a fixing liquid was as below.

| | |
|---|---|
| Ammonium thiosulfate solution (75% by mass) | 300 mL |
| Ammonium sulfite monohydrate | 25 g |
| 1,3-Diaminopropane tetraacetic acid | 8 g |
| Acetic acid | 5 g |
| Ammonia water (27% by mass) | 1 g |
| The pH was adjusted to 6.2. | |

A sensitive material which had been subjected to exposure was completed by using the treatment agent above was treated under the treatment conditions: development at 35° C. for 30 seconds, fixing at 34° C. for 23 seconds, and water washing with flowing water (5 L/minutes) for 20 seconds, by using an automatic developing machine FG-710PTS manufactured by Fujifilm Corporation.

A conductive layer having an embodiment including the plurality of thus formed fine metal wires which was arranged in a mesh shape and each of which was formed of silver or an alloy containing silver was formed. The conductive layer of the embodiment was described as "Silver mesh" in Table 2. The laminate of the obtained biaxially oriented PET film and the conductive layer was used as the second transparent base material film.

<Production of Transparent Base Material Film Laminate>

First, four slits were formed in the obtained long second transparent base material film having a width of 1.2 m to be parallel with the side of an image display portion of an image display device (FLATORON IPS226V, liquid crystal monitor, manufactured by LG Electronics Japan Inc., image display portion: vertical 27 cm and horizontal 48 cm) in the machine direction, which will be described later, in the width direction of the second transparent base material film before slitting and was processed into four long films. Regarding the second transparent base material films after slitting, the angle of the slow axis of the second transparent base material film with respect to the width direction was measured. Among the second transparent base material films after slitting, a second transparent base material film in which the angle of the slow axis of the second transparent base material film with respect to the width direction was the angle shown in Table 2 was used. In general, a shift in the angle of the slow axis of the film with respect to the width direction is small at the center portion of the film in the width direction and the shift in the angle of the slow axis of the film with respect to the width direction is large at the end portion of the film in the width direction. Therefore, the angle of the slow axis of the film with respect to the width direction after slitting can be selected according to the position of the film before slitting. Next, the second transparent base material film after slitting was cut out in a rectangular shape along the side of the image display portion of the image display device in the transverse direction.

The first transparent base material film having a width of 2 m was wound off from the roll and six slits were first formed in the first transparent base material film in the width direction of the first transparent base material film before slitting so as to have the same width as the width of the second transparent base material film cut out in a rectangular shape. Then, the slit film was processed into six long films. Regarding the first transparent base material films after slitting, the angle of the slow axis of the first transparent base material film in the width direction was measured. Among the first transparent base material films after slitting, a first transparent base material film in which the angle of the slow axis of the first transparent base material film with respect to the width direction was the angle shown in Table 1 was used. Next, the first transparent base material film was cut out in a rectangular shape having the same size as the size of the second transparent base material film.

The directions of the slow axes of the first transparent base material film and the second transparent base material film were obtained in advance according to the following method.

Then, the first transparent base material film and the second transparent base material film were laminated through a pressure sensitive adhesive (Opteria MO series manufactured by Lintec Corporation) such that the angle formed between the slow axis of the first transparent base material film and the absorption axis of the polarizing plate, the angle formed between the slow axis of the second transparent base material film and the absorption axis of the polarizing plate, and the angle formed between the slow axis of the first transparent base material film and the slow axis of the second transparent base material film shown in Tables 1 and 2 were obtained.

In the first transparent base material film in the transparent base material film laminate, the angle of the slow axis of the first transparent base material film with respect to the width direction is preferably 0°±10° or 90°±10°, more preferably 0°±5° or 90°±5°, and particularly preferably 0°±3° or 90°±3°.

In the second transparent base material film in the transparent base material film laminate, the angle of the slow axis of the second transparent base material film in the width direction is preferably 0°±30° or 90°±30°, more preferably 0°±15° or 90°±15°, and particularly preferably 0°±7° or 90°±7°.

<Production of Image Display Device>

An image display device (FLATORON IPS226V, liquid crystal monitor, manufactured by LG Electronics Japan Inc.) in which a backlight side polarizing plate, a liquid crystal cell, and a viewing side polarizing plate were arranged on the backlight light source of a continuous light source (white LED) in this order was used. The transparent base material film laminate of Example 1 was laminated on the viewing side polarizing plate with an adhesive (WORLD ROCK HRJ manufactured by Kyoritsu Chemical & Co., Ltd.) such that the arrangement position of the second transparent base material film was the position shown in Table 2.

The polarizing plate and the transparent base material film laminate were laminated such that the angle formed between the slow axis of the transparent base material film and the absorption axis of the polarizing plate was the angle shown in Table 1 and 2.

The angle formed between the left and right sides of the transparent base material film laminate and the absorption axis of the polarizing plate was set to 0°.

The absorption axis of the polarizing plate (the absorption axis of the polarizer) in the image display device used was directed in the horizontal direction with respect to the image display portion (display screen) of the image display device, and the angle formed between each side of the image display device in the horizontal direction and the absorption axis of the polarizing plate was 0°. The transparent base material film, the polarizing plate, and the image display portion of the image display device were formed in a rectangular shape when viewed from the viewing side of the image display device. That is, either the angle formed between each side of the transparent base material film and the absorption axis of the polarizing plate or the angle formed between each side of the transparent base material film and each side of the image display device was set to 0° (transverse direction) and 90° (machine direction).

Examples 2 to 17 and Comparative Examples 1 to 8

Transparent base material film laminates and image display devices of each of Examples and Comparative Examples were produced in the same manner as in Example 1 except that the thickness, Re, Rth, and Re/Rth of the first transparent base material film and the second transparent base material film, the angle formed between the slow axis of each film and the absorption axis of the polarizing plate, the transparent conductive layer, the angle formed between the slow axes of the first transparent base material film and the second transparent base material film, and the arrangement position of the second transparent base material film were changed as shown in Tables 1 and 2.

The Re, Rth, and Re/Rth of the first transparent base material film and the second transparent base material film were adjusted by appropriately changing the machine-direction stretching ratio, the cross-direction stretching ratio, the cross-direction stretched film temperature (film surface temperature), the highest reachable film surface temperature at thermal fixing/relaxation, the MD relaxation rate, the TD relaxation rate, and the film thickness.

In Example 17, a conductive layer which was a conductive layer of an embodiment formed of oxide and which the oxide was formed of indium oxide containing tin oxide was formed with reference to paragraphs [0042] to [0045] of JP2010-27293A. The conductive layer of the embodiment was expressed as "ITO" in Table 2.

[Film Measurement Results]

<Film Thickness Measurement>

The thickness of each transparent base material film obtained was obtained in the following manner.

The thickness of each transparent base material film was measured by using a contact type film thickness meter (manufactured by Anritsu Co., Ltd.) by selecting 50 sample points at equal intervals of 0.5 m in a direction of machine-direction stretching (longitudinal direction), further selecting 50 sample points at equal intervals (50 equally divided points in the width direction) across the entire width of the film in the width direction of the film (the direction orthogonal to the longitudinal direction), and then measuring the thickness at these 100 points. The average thickness of these 100 points was obtained and then considered as the thickness of the film. The results are shown in Tables 1 and 2.

<Re, Rth, and Re/Rth>

The film in-plane retardation Re is a parameter defined by a product ($\Delta nxy \times d$) of the refractive index anisotropy ($\Delta nxy = |nx-ny|$) of two axes orthogonal to each other on the film and the thickness d (nm) of the film and is a measure showing optical isotropy and optical anisotropy. The refractive index anisotropy ($\Delta nxy$) of two axes is obtained by the following method. The orientation directions of the film were obtained using two polarizing plates and the film was cut to a rectangular shape having a size of 4 cm×2 cm so that the orientation axis directions were orthogonal to each other, thereby preparing a measurement sample. Regarding this sample, the refractive indices (nx and ny) of two axes orthogonal to each other and the refractive index (nz) in the thickness direction were obtained by using an Abbe refractometer (NAR-4T, manufactured by Atago Co., Ltd., a measurement wavelength of 589 nm) and the absolute value of a difference between refractive indices of two axes ($|nx-ny|$) was used as the refractive index anisotropy ($\Delta Nxy$). The thickness d (nm) of the film was measured by using an electric micrometer (Miritoron 1245D manufactured by Fine Liu full Ltd.) and the unit was converted into nm. From the product ($\Delta nxy \times d$) of the refractive index anisotropy ($\Delta Nxy$) and the thickness d (nm) of the film, the retardation (Re) was obtained.

The retardation Rth in the film thickness direction was calculated by Rth={(nx+ny)/2−nz}×d. In the same method as in the measurement of the retardation, the nx, ny, and nz and the thickness d (nm) of the film were obtained and Rth={(nx+ny)/2−nz}×d was calculated to obtain the retardation (Rth) in the film thickness direction.

The Re/Rth was calculated from the obtained Re and Rth.

The results are shown in Tables 1 and 2.

<Measurement of Slow Axis of Transparent Base Material Film, Measurement of Angle Formed Between Slow Axis of Transparent Base Material Film and Absorption Axis of Polarizing Plate, and Measurement of Angle Formed Between Slow Axes of First Transparent Base Material Film and Second Transparent Base Material Film>

From the image display device in each of Examples and Comparative Examples, the polarizing plate, the first transparent base material film, and the second transparent base material film which were respectively laminated through an adhesive or a pressure sensitive adhesive were peeled off and separated using a solvent. As the solvent, acetone was used. However, any solvent may be used as long as the adhesive and the pressure sensitive adhesive can be peeled off without dissolving the polarizing plate and the transparent base material itself. For example, a solvent such as tetrahydrofuran and ethanol can be used.

Regarding the separated polarizing plate, the center portion of the polarizing plate was cut out in a 50 mm square to be parallel with or vertical to the left and right sides of the polarizing plate so as to obtain a sample. The direction of the absorption axis of the polarizing plate was measured with VAP-7070 (manufactured by JASCO Corporation by using this sample.

Regarding the separated first transparent base material film and second transparent base material film, the center portions of the respective films were cut out to be parallel with and vertical to the left and right sides of the film so as to obtain a sample of a 50 mm square. The direction of the slow axis was measured with a RETS 2000 manufactured by Otsuka Electronics Co., Ltd.) by using this sample.

The angles formed between the slow axes of the transparent base material films and the absorption axis of the polarizing plate, and the angle formed between the slow axes of the first transparent base material film and the second transparent base material film in a state of the transparent base material film laminate in each of Examples and Comparative Examples were obtained from the obtained direction of the absorption axis of the polarizing plate and the directions of the slow axes of the first transparent base material film and the second transparent base material film. The obtained results are shown in Tables 1 and 2.

The measurement of these films was carried out at 25° C. and a relative humidity of 60%.

In addition, it was confirmed that the obtained angle formed between the slow axis of the transparent base material film and the absorption axis of the polarizing plate and angle formed between the slow axes of the first transparent base material film and the second transparent base material film respectively coincided with angles when each member was laminated in the production of an image display device.

[Evaluation]
<Production Loss>

The second transparent base material film before punching formed to have a width of 1.3 m and a length of 8,000 m was wound off. The second transparent base material film was punched at an angle with respect to the longitudinal direction and the width direction to be laminated the transparent base material film and the polarizing plate at the angle formed between the slow axis and the absorption axis of the polarizing plate shown in Tables 1 and 2, that is, to be used in the transparent base material film laminate of each of Examples and Comparative Examples.

The production loss was evaluated based on the following standards. It is required that the production loss is evaluated as A, B or C for practical use. The production loss is preferably evaluated as A or B and more preferably evaluated as A.

A: The second transparent base material film in the form of using 95% or more of the second transparent base material film before punching in the transparent base material film laminate is obtained.

B: The second transparent base material film in the form of using 80% or more and less than 95% of the second transparent base material film before punching in the transparent base material film laminate is obtained.

C: The second transparent base material film in the form of using 65% or more and less than 80% of the second transparent base material film before punching in the transparent base material film laminate is obtained.

D: The second transparent base material film in the form of using 50% or more and less than 65% of the second transparent base material film before punching in the transparent base material film laminate is obtained.

E: The second transparent base material film in the form of using less than 50% of the second transparent base material film before punching in the transparent base material film laminate is obtained.

The evaluated results are shown in Table 2.
<Rainbow Unevenness>

The backlight light source of the obtained image display device was switched on and the rainbow unevenness generated was visually observed through polarized sunglasses and evaluated based on the following standards. It is required that the rainbow unevenness is evaluated as A, B or C for practical use. The rainbow unevenness is preferably evaluated as A or B and more preferably evaluated as A.

A: No rainbow unevenness is observed.
B: Rainbow unevenness is not observed.
C: Rainbow unevenness is hardly observed.
D: Rainbow unevenness is observed.
E: Rainbow unevenness is remarkably observed.

The evaluated results are shown in Table 2.
<Blackout>

The backlight light source of the obtained image display device was switched on and the blackout occurring in a case in which the device was observed while rotating polarized sunglasses was evaluated based on the following standards. It is required that the blackout is evaluated as A, B or C for practical use. The blackout is preferably evaluated as A or B and more preferably evaluated as A.

A: No blackout occurs.
B: There is a slightly dark portion.
C: There is a somewhat dark portion.
D: Blackout occurs.

The evaluated results are shown in Table 2.

TABLE 1

| | | | First transparent base material film | | | | | | | | |
|---|---|---|---|---|---|---|---|---|---|---|---|
| | Kind | Thickness [μm] | Refractive index nx | ny | nz | Angle of slow axis with respect to width direction [°] | Degree of crystallization [%] | Re [nm] | Rth [nm] | Re/Rth [-] | Angle formed between slow axis and absorption axis of polarizing plate [°] |
| Example 1 | Uniaxially oriented PET | 95 | 1.687 | 1.587 | 1.527 | 2 | 34 | 9,500 | 10,450 | 0.91 | 45 |
| Example 2 | Uniaxially oriented PET | 65 | 1.687 | 1.587 | 1.527 | 2 | 34 | 6,500 | 7,150 | 0.91 | 45 |
| Example 3 | Uniaxially oriented PET | 45 | 1.687 | 1.587 | 1.527 | 2 | 34 | 4,500 | 4,950 | 0.91 | 45 |
| Example 4 | Uniaxially oriented PET | 95 | 1.687 | 1.587 | 1.527 | 2 | 34 | 9,500 | 10,450 | 0.91 | 39 |
| Example 5 | Uniaxially oriented PET | 95 | 1.687 | 1.587 | 1.527 | 2 | 34 | 9,500 | 10,450 | 0.91 | 31 |
| Example 6 | Uniaxially oriented PET | 95 | 1.687 | 1.587 | 1.527 | 2 | 34 | 9,500 | 10,450 | 0.91 | 45 |
| Example 7 | Uniaxially oriented PET | 95 | 1.687 | 1.587 | 1.527 | 2 | 34 | 9,500 | 10,450 | 0.91 | 45 |
| Example 8 | Uniaxially oriented PET | 95 | 1.687 | 1.587 | 1.527 | 2 | 34 | 9,500 | 10,450 | 0.91 | 45 |
| Example 9 | Uniaxially oriented PET | 97 | 1.687 | 1.587 | 1.527 | 2 | 34 | 9,500 | 10,450 | 0.91 | 36 |
| Example 10 | Uniaxially oriented PET | 95 | 1.687 | 1.587 | 1.527 | 2 | 34 | 9,500 | 10,450 | 0.91 | 45 |
| Example 11 | Uniaxially oriented PET | 95 | 1.687 | 1.587 | 1.527 | 2 | 34 | 9,500 | 10,450 | 0.91 | 45 |
| Example 12 | Uniaxially oriented PET | 95 | 1.698 | 1.597 | 1.505 | 4 | 34 | 9,600 | 13,500 | 0.71 | 45 |
| Example 13 | Biaxially oriented PET | 95 | 1.701 | 1.618 | 1.490 | 4 | 40 | 7,900 | 16,100 | 0.49 | 45 |
| Example 14 | Uniaxially oriented PET | 95 | 1.687 | 1.587 | 1.527 | 2 | 34 | 9,500 | 10,450 | 0.91 | 45 |

TABLE 1-continued

| | | First transparent base material film | | | | | | | | | | |
|---|---|---|---|---|---|---|---|---|---|---|---|---|
| | | Thick-ness | Refractive index | | | Angle of slow axis with respect to width direction | Degree of crystal-lization | Re | Rth | Re/Rth | Angle formed between slow axis and absorption axis of polarizing plate |
| | Kind | [μm] | nx | ny | nz | [°] | [%] | [nm] | [nm] | [-] | [°] |
| Example 15 | Uniaxially oriented PET | 95 | 1.687 | 1.587 | 1.527 | 2 | 34 | 9,500 | 10,450 | 0.91 | 45 |
| Example 16 | Uniaxially oriented PET | 95 | 1.687 | 1.587 | 1.527 | 2 | 34 | 9,500 | 10,450 | 0.91 | 45 |
| Example 17 | Uniaxially oriented PET | 95 | 1.687 | 1.587 | 1.527 | 2 | 34 | 9,500 | 13,450 | 0.91 | 45 |
| Comparative Example 1 | Uniaxially oriented PET | 35 | 1.687 | 1.587 | 1.527 | 2 | 34 | 3,500 | 3,850 | 0.91 | 45 |
| Comparative Example 2 | Uniaxially oriented PET | 95 | 1.687 | 1.587 | 1 527 | 2 | 34 | 9,500 | 10,450 | 0.91 | 24 |
| Comparative Example 3 | Uniaxially oriented PET | 95 | 1.687 | 1.58'7 | 1.527 | 2 | 34 | 9,500 | 10,450 | 0.91 | 1 |
| Comparative Example 4 | Uniaxially oriented PET | 95 | 1.687 | 1.587 | 1.527 | 2 | 34 | 9,500 | 10,450 | 0.91 | 45 |
| Comparative Example 5 | Uniaxially oriented PET | 95 | 1.687 | 1.587 | 1.527 | 2 | 34 | 9,500 | 10,450 | 0.91 | 45 |
| Comparative Example 6 | Uniaxially oriented PET | 35 | 1.687 | 1.587 | 1.527 | 2 | 34 | 3,500 | 3,850 | 0.91 | 45 |
| Comparative Example 7 | Uniaxially oriented PET | 95 | 1.687 | 1.587 | 1.527 | 2 | 34 | 9,500 | 10,450 | 0.91 | 30 |
| Comparative Example 8 | Uniaxially oriented PET | 95 | 1.687 | 1.587 | 1.527 | 2 | 34 | 9,500 | 10,450 | 0.91 | 45 |

TABLE 2

| | Second transparent base material film | | | | | | | | | | | | | Angle formed between slow axis and absorption axis of polarizing plate [°] | | Angle formed between slow axes [°] | Arrangement position of second transparent base material film | Evaluation | | | |
|---|---|---|---|---|---|---|---|---|---|---|---|---|---|---|---|---|---|---|---|---|---|
| | Kind | Thickness [μm] | Refractive Index nx | ny | nz | Angle of slow axis with respect to width direction [°] | Degree of crystallization [%] | Re [nm] | Rth [nm] | Re/Rth [-] | | | | Conductive layer | | | | Production loss | Rain-unevenness | Black-out |
| Example 1 | Biaxially oriented PET | 40 | 1.675 | 1.635 | 1.490 | 1 | 41 | 1,600 | 6,600 | 0.24 | | | 1 | Silver mesh | | 44 | Viewing side | A | A | A |
| Example 2 | Biaxially oriented PET | 40 | 1.675 | 1.635 | 1.490 | 1 | 41 | 1,600 | 6,600 | 0.24 | | | 1 | Silver mesh | | 44 | Viewing side | A | B | A |
| Example 3 | Biaxially oriented PET | 40 | 1.675 | 1.635 | 1.490 | 1 | 41 | 1,600 | 6,600 | 0.24 | | | 1 | Silver mesh | | 44 | Viewing side | A | C | A |
| Example 4 | Biaxially oriented PET | 40 | 1.675 | 1.635 | 1.490 | 1 | 41 | 1,600 | 6,600 | 0.24 | | | 1 | Silver mesh | | 38 | Viewing side | A | B | A |
| Example 5 | Biaxially oriented PET | 40 | 1.675 | 1.635 | 1.490 | 1 | 41 | 1,600 | 6,600 | 0.24 | | | 1 | Silver mesh | | 30 | Viewing side | A | B | B |
| Example 6 | Biaxially oriented PET | 40 | 1.661 | 1.646 | 1.493 | 1 | 41 | 600 | 6,400 | 0.09 | | | 88 | Silver mesh | | 43 | Viewing side | A | A | B |
| Example 7 | Biaxially oriented PET | 40 | 1.667 | 1.642 | 1.492 | 88 | 41 | 1,000 | 6,500 | 0.15 | | | 14 | Silver mesh | | 31 | Viewing side | A | B | B |
| Example 8 | Biaxially oriented PET | 40 | 1.675 | 1.635 | 1.490 | 10 | 41 | 1,600 | 6,600 | 0.24 | | | 27 | Silver mesh | | 18 | Viewing side | B | B | B |
| Example 9 | Biaxially oriented PET | 40 | 1.675 | 1.635 | 1.490 | 1 | 41 | 1,600 | 6,600 | 0.24 | | | 27 | Silver mesh | | 9 | Viewing side | B | C | C |
| Example 10 | Biaxially oriented PET | 75 | 1.675 | 1.635 | 1.490 | 2 | 41 | 3,000 | 12,375 | 0.24 | | | 1 | Silver mesh | | 44 | Viewing side | A | B | A |
| Example 11 | Biaxially oriented PET | 125 | 1.675 | 1.635 | 1.490 | 2 | 41 | 5,000 | 20,625 | 0.24 | | | 1 | Silver mesh | | 44 | Viewing side | A | C | A |
| Example 12 | Biaxially oriented PET | 40 | 1.675 | 1.635 | 1.490 | 1 | 41 | 1,600 | 6,600 | 0.24 | | | 1 | Silver mesh | | 44 | Viewing side | A | B | A |
| Example 13 | Biaxially oriented PET | 40 | 1.675 | 1.635 | 1.490 | 1 | 41 | 1,600 | 6,600 | 0.24 | | | 1 | Silver mesh | | 44 | Viewing side | A | C | B |
| Example 14 | Biaxially oriented PET | 40 | 1.675 | 1.635 | 1.490 | 1 | 41 | 4,000 | 4,400 | 0.91 | | | 1 | Silver mesh | | 44 | Viewing side | A | A | A |
| Example 15 | Uniaxially oriented PET | 40 | 1.687 | 1.587 | 1.527 | 1 | 41 | 1,600 | 6,600 | 0.24 | | | 1 | Silver mesh | | 44 | Viewing side | A | B | A |
| Example 16 | Biaxially oriented PET | 40 | 1.675 | 1.635 | 1.490 | 1 | 41 | 1,600 | 6,600 | 0.24 | | | 1 | Silver mesh | | 44 | Viewing side | A | A | A |
| Example 17 | Biaxially oriented PET | 40 | 1.675 | 1.635 | 1.490 | 1 | 41 | 1,600 | 6,600 | 0.24 | | | 1 | ITO | | 44 | Viewing side | A | A | A |
| Comparative Example 1 | Biaxially oriented PET | 40 | 1.675 | 1.635 | 1.490 | 1 | 41 | 1,600 | 6,600 | 0.24 | | | 1 | Silver mesh | | 44 | Viewing side | A | D | C |
| Comparative Example 2 | Biaxially oriented PET | 40 | 1.675 | 1.635 | 1.490 | 1 | 41 | 1,600 | 6,600 | 0.24 | | | 1 | Silver mesh | | 23 | Viewing side | A | E | C |
| Comparative Example 3 | Biaxially oriented PET | 40 | 1.675 | 1.635 | 1.490 | 1 | 41 | 1,600 | 6,600 | 0.24 | | | 1 | Silver mesh | | 0 | Viewing side | A | E | D |
| Comparative Example 4 | Biaxially oriented PET | 40 | 1.675 | 1.635 | 1.490 | 1 | 41 | 1,600 | 6,600 | 0.24 | | | 34 | Silver mesh | | 11 | Viewing side | D | D | B |
| Comparative Example 5 | Biaxially oriented PET | 40 | 1.675 | 1.635 | 1.490 | 1 | 41 | 1,600 | 6,600 | 0.24 | | | 45 | Silver mesh | | 0 | Viewing side | E | E | A |
| Comparative Example 6 | Biaxially oriented PET | 40 | 1.675 | 1.635 | 1.490 | 1 | 41 | 1,600 | 6,600 | 0.24 | | | 1 | Silver mesh | | 44 | Backlight light source side | A | E | A |
| Comparative Example 7 | Biaxially oriented PET | 40 | 1.675 | 1.635 | 1.490 | 1 | 41 | 1,600 | 6,600 | 0.24 | | | 30 | Silver mesh | | 0 | Viewing side | C | E | C |
| Comparative Example 8 | Biaxially oriented PET | 40 | 1.675 | 1.635 | 1.490 | 1 | 41 | 1,600 | 6,600 | 0.24 | | | 1 | Silver mesh | | 44 | Backlight light source side | A | D | A |

From Tables 1 and 2, it was found that the transparent base material film laminate of the present invention was able to suppress production loss, suppress the occurrence of rainbow unevenness, and suppress the occurrence of blackout. When the light transmittance of each of the first transparent base material film, the second transparent base material film, and the transparent conductive layer of the transparent base material film laminate of the present invention, and the transparent base material film laminate was measured by the method described in the specification, the light transmittance of the first transparent base material film was 90% or higher, and the light transmittance of each of the second transparent base material film, the transparent conductive layer and the transparent base material film laminate was 80% or higher.

On the other hand, from Comparative Example 1, it was found that in a case in which the Re of the first transparent base material film was less than the lower limit defined in the present invention, the occurrence of rainbow unevenness was not able to be sufficiently suppressed.

From Comparative Example 2, it was found that in a case in which the angle formed between the slow axis of the first transparent base material film and the absorption axis of the polarizing plate was out of the range defined in the present invention, the occurrence of rainbow unevenness was not able to be sufficiently suppressed and the occurrence of blackout was not able to be sufficiently suppressed.

From Comparative Example 3, it was found that in a case in which the angle formed between the slow axis of the first transparent base material film and the absorption axis of the polarizing plate was out of the range defined in the present invention, and the angle formed between the slow axes of the first transparent base material film and the second transparent base material film was out of the range defined in the present invention, the occurrence of rainbow unevenness was not able to be sufficiently suppressed and the occurrence of blackout was not able to be sufficiently suppressed.

From Comparative Example 4, it was found that in a case in which the angle formed between the slow axis of the second transparent base material film and the absorption axis of the polarizing plate was out of the range defined in the present invention, production loss was not able to be sufficiently suppressed and the occurrence of rainbow unevenness was not able to be sufficiently suppressed.

From Comparative Example 5, it was found that in a case in which the angle formed between the slow axis of the second transparent base material film and the absorption axis of the polarizing plate was out of the range defined in the present invention, and the angle formed between the slow axes of the first transparent base material film and the second transparent base material film was out of the range defined in the present invention, production loss was not able to be sufficiently suppressed and the occurrence of rainbow unevenness was not able to be sufficiently suppressed.

From Comparative Example 6, it was found that in a case in which the Re of the first transparent base material film was less than the lower limit defined in the present invention and the arrangement position of the second transparent base material film was closer to the backlight light source side than to the first transparent base material film, the occurrence of rainbow unevenness was not able to be sufficiently suppressed.

From Comparative Example 7, it was found that in a case in which the angle formed between the slow axes of the first transparent base material film and the second transparent base material film was out of the range defined in the present invention, the occurrence of rainbow unevenness was not able to be sufficiently suppressed.

From Comparative Example 8, it was found that in a case in which the arrangement position of the second transparent base material film was closer to the backlight light source side than to the first transparent base material film, the occurrence of rainbow unevenness was not able to be sufficiently suppressed.

EXPLANATION OF REFERENCES

1: first transparent base material film
1A: direction of slow axis of first transparent base material film
2: second transparent base material film
2A: direction of slow axis of second transparent base material film
3: pressure sensitive adhesive
4: conductive layer
5: transparent base material film laminate
6: front plate
7: touch panel
11: polarizing plate
11A: direction of absorption axis of polarizing plate
12: adhesive
13: liquid crystal cell
14: backlight light source
15: image display device
21A: viewing side
111A: angle formed between slow axis of first transparent base material film and absorption axis of polarizing plate
112A: angle formed between slow axis of second transparent base material film and absorption axis of polarizing plate
113A: angle formed between slow axis of first transparent base material film and slow axis of second transparent base material film

What is claimed is:

1. A transparent base material film laminate that is used by being arranged on a viewing side of a polarizing plate of an image display device having at least a backlight light source and the polarizing plate that is arranged on a viewing side of the backlight light source, the transparent base material film laminate comprising:
    at least a first transparent base material film and a second transparent base material film,
    wherein a film in-plane retardation Re of the first transparent base material film is 4,000 nm or more, and
    the transparent base material film laminate is arranged for use such that an angle formed between a slow axis of the first transparent base material film and an absorption axis of the polarizing plate is 45°±20°, and
    such that an angle formed between a slow axis of the second transparent base material film and the absorption axis of the polarizing plate is 90°±30° or 0°±30°,
    an angle formed between the slow axes of the first transparent base material film and the second transparent base material film is neither 0° nor 90°, and
    the second transparent base material film is arranged on a viewing side with respect to the first transparent base material film.

2. The transparent base material film laminate according to claim 1,
    wherein a film in-plane retardation Re of the second transparent base material film is larger than 0 nm and is smaller than the film in-plane retardation Re of the first transparent base material film.

3. The transparent base material film laminate according to claim 1,
wherein a ratio Re/Rth of the film in-plane retardation Re of the first transparent base material film and a retardation Rth of the first transparent base material film in a film thickness direction is 0.5 or more.

4. The transparent base material film laminate according to claim 1,
wherein a retardation Rth of the second transparent base material film in a film thickness direction is 20,000 nm or less.

5. The transparent base material film laminate according to claim 1,
wherein at least one of the first transparent base material film or the second transparent base material film is a polyester film.

6. The transparent base material film laminate according to claim 1,
wherein the first transparent base material film is a uniaxially oriented polyester film.

7. The transparent base material film laminate according to claim 1,
wherein the second transparent base material film is a biaxially oriented polyester film.

8. The transparent base material film laminate according to claim 1,
wherein a thickness of the first transparent base material film is 40 μm or more.

9. The transparent base material film laminate according to claim 1,
wherein a thickness of the second transparent base material film is 80 μm or less and is smaller than the thickness of the first transparent base material film.

10. The transparent base material film laminate according to claim 1,
wherein the image display device has a liquid crystal cell between the backlight light source and the polarizing plate.

11. The transparent base material film laminate according to claim 1,
wherein the second transparent base material film is a conductive film in which a conductive layer is formed.

12. The transparent base material film laminate according to claim 11,
wherein the conductive layer includes a plurality of fine metal wires.

13. The transparent base material film laminate according to claim 12,
wherein the fine metal wires are arranged in a mesh shape.

14. The transparent base material film laminate according to claim 12,
wherein the fine metal wires are randomly arranged.

15. The transparent base material film laminate according to claim 12,
wherein the fine metal wire is formed of silver or an alloy including silver.

16. The transparent base material film laminate according to claim 12,
wherein the fine metal wire is formed of copper or an alloy including copper.

17. The transparent base material film laminate according to claim 11,
wherein the conductive layer is formed of an oxide.

18. The transparent base material film laminate according to claim 17,
wherein the oxide is an indium oxide containing a tin oxide or a tin oxide containing antimony.

19. The transparent base material film laminate according to claim 1,
wherein the first transparent base material film and the second transparent base material film are laminated through a pressure sensitive adhesive.

20. The transparent base material film laminate according to claim 1,
wherein the backlight light source is a white light emitting diode of a fluorescence system.

21. The transparent base material film laminate according to claim 1,
wherein the transparent base material film laminate has a quadrilateral shape and is arranged for use such that an angle formed between each side of the transparent base material film laminate and the absorption axis of the polarizing plate is 90°±30° or 0°±30°.

22. The transparent base material film laminate according to claim 1,
wherein the transparent base material film laminate has a quadrilateral shape and an angle formed between each side of the transparent base material film laminate and the slow axis of the second transparent base material film is 90°±30° or 0°±30°.

23. A touch panel sensor film comprising:
the transparent base material film laminate according to claim 1.

24. A touch panel comprising:
the transparent base material film laminate according to claim 1.

25. An image display device comprising:
the transparent base material film laminate according to claim 1.

26. A method for improving visibility of an image display device having at least a backlight light source and a polarizing plate that is arranged on a viewing side of the backlight light source, the method comprising:
arranging the transparent base material film laminate according to claim 1 on a viewing side of the polarizing plate,
wherein the transparent base material film laminate has at least a first transparent base material film and a second transparent base material film,
a film in-plane retardation Re of the first transparent base material film is 4,000 nm or more,
the transparent base material film laminate is arranged for use such that an angle formed between a slow axis of the first transparent base material film and an absorption axis of the polarizing plate is 45°±20°, and
such that an angle formed between a slow axis of the second transparent base material film and the absorption axis of the polarizing plate is 90°±30° or 0°±30°,
an angle formed between the slow axis of the first transparent base material film and the slow axis of the second transparent base material film is neither 0° nor 90°, and
the second transparent base material film is used by being arranged on a viewing side with respect to the first transparent base material film.

* * * * *